(12) United States Patent
Jolley

(10) Patent No.: US 12,410,844 B2
(45) Date of Patent: Sep. 9, 2025

(54) SYSTEMS AND METHODS FOR PROVIDING ADVANCED SPRINGS

(71) Applicant: Elliott Jolley, Vernal, UT (US)

(72) Inventor: Elliott Jolley, Vernal, UT (US)

( * ) Notice: Subject to any disclaimer, the term of this patent is extended or adjusted under 35 U.S.C. 154(b) by 696 days.

(21) Appl. No.: 17/671,439

(22) Filed: Feb. 14, 2022

(65) Prior Publication Data

US 2022/0163083 A1 May 26, 2022

Related U.S. Application Data

(63) Continuation-in-part of application No. 17/093,471, filed on Nov. 9, 2020, now Pat. No. 11,246,682.

(51) Int. Cl.
*A61C 7/36* (2006.01)
*F16F 1/04* (2006.01)

(52) U.S. Cl.
CPC .............. *F16F 1/046* (2013.01); *A61C 7/36* (2013.01); *F16F 2238/026* (2013.01)

(58) Field of Classification Search
CPC ........................................................ A61C 7/36
USPC ........................................................... 433/19
See application file for complete search history.

(56) References Cited

U.S. PATENT DOCUMENTS

| | | | |
|---|---|---|---|
| 3,618,214 A | 11/1971 | Armstrong | |
| 4,315,739 A | 2/1982 | Cain | |
| 5,509,642 A * | 4/1996 | Wells | A47C 27/07 5/256 |
| 6,149,143 A * | 11/2000 | Richmond | A47C 23/0433 267/92 |
| 6,684,435 B1 * | 2/2004 | Wells | A47C 27/07 5/248 |
| 8,978,183 B1 * | 3/2015 | Richmond | A47C 27/062 5/655.8 |
| 10,123,855 B1 * | 11/2018 | Coleman | A61C 7/12 |
| 2002/0026129 A1 * | 2/2002 | White | A61M 25/00 600/585 |
| 2008/0138759 A1 * | 6/2008 | Kravitz | A61C 7/22 433/21 |
| 2010/0022821 A1 | 1/2010 | Dubi et al. | |
| 2010/0257675 A1 * | 10/2010 | DeMoss | A47C 27/065 5/716 |

(Continued)

FOREIGN PATENT DOCUMENTS

EP 0579422 A2 1/1994
WO 2015157472 A1 10/2015

*Primary Examiner* — Nicholas D Lucchesi
(74) *Attorney, Agent, or Firm* — Bryant J. Keller; John Oldroyd; Kirton McConkie

(57) ABSTRACT

An advanced (or supercoil) spring is disclosed herein. While the advanced spring can include any suitable feature, in some cases, it includes a coil spring having multiple external coils that define a portion of an inner lumen of the coil spring. In some such case, the coil spring further includes a first internal coil that extends at least partially into the inner lumen of the coil spring. In some cases, the external coils and the first internal coil are each made of, and comprise part of, one single continuous spring wire. In some cases, the coil spring includes a tension spring such that surfaces of adjacent external coils contact each other, and such that the first internal coil is disposed within a portion of the inner lumen defined by the adjacent external coils, when the coil spring is at rest. Additional implementations are discussed herein.

20 Claims, 13 Drawing Sheets

(56) References Cited

U.S. PATENT DOCUMENTS

2010/0307511 A1    12/2010   Meade
2018/0116767 A1     5/2018   Abels et al.

\* cited by examiner

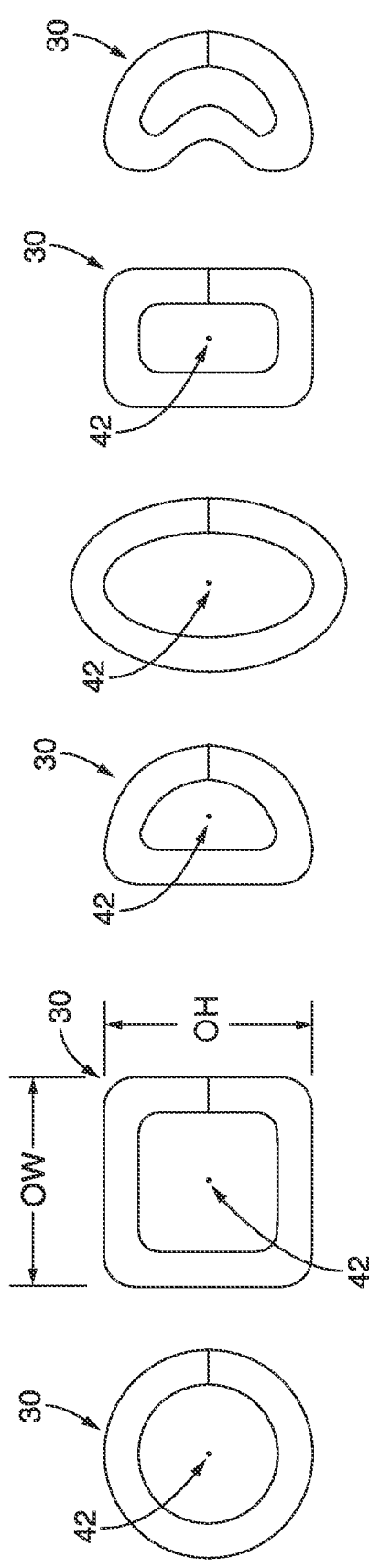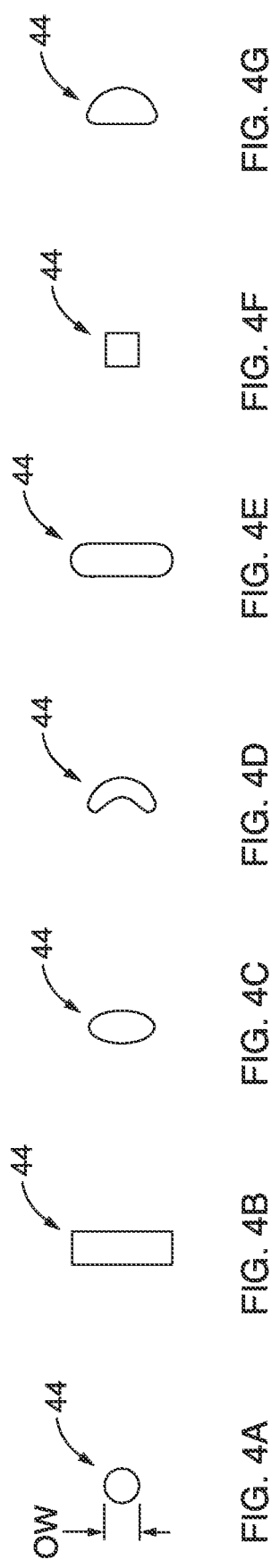

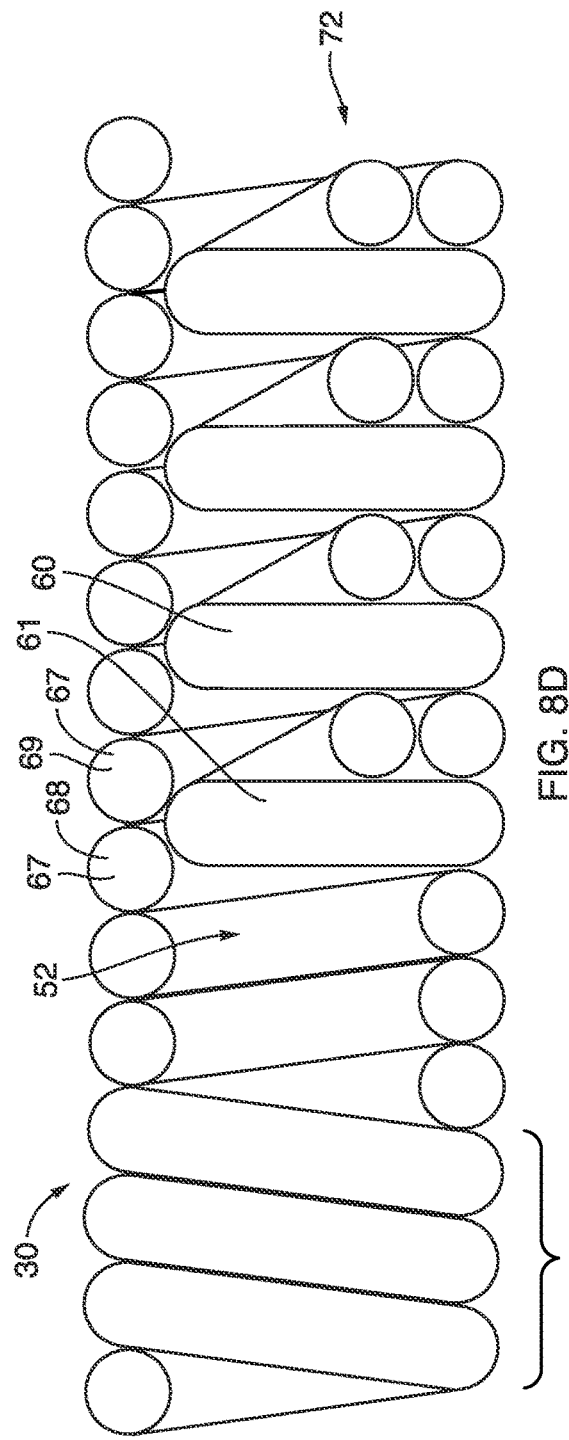
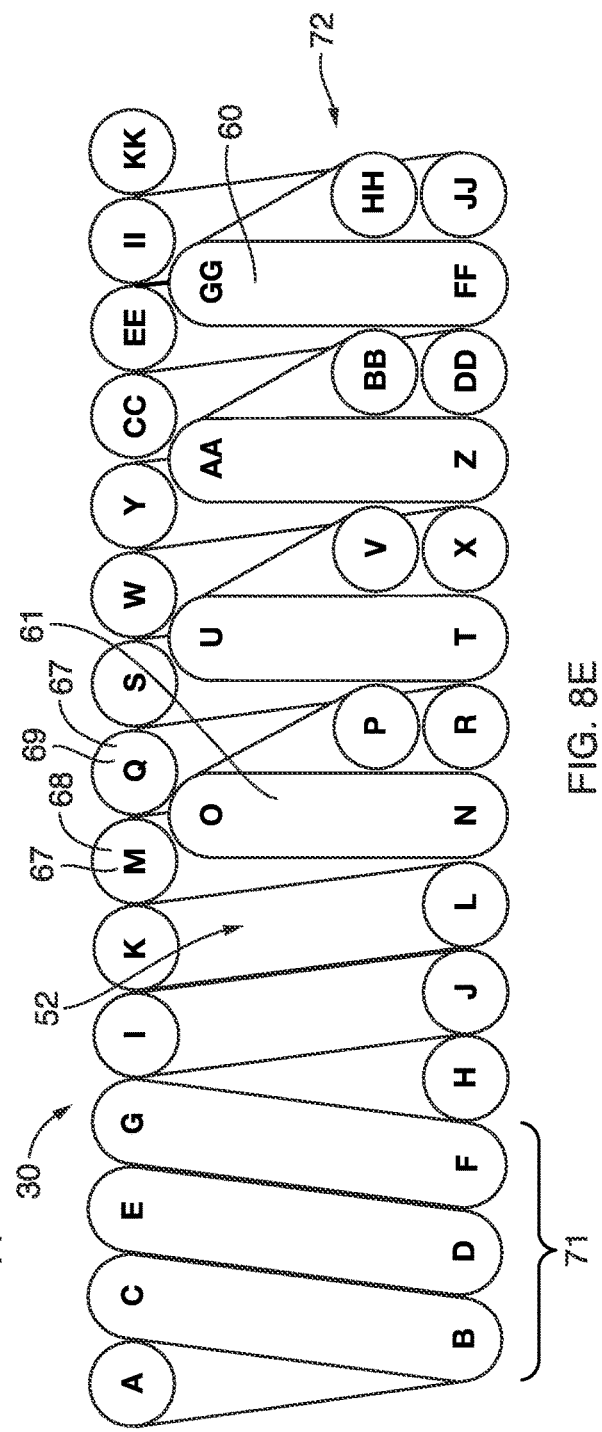
FIG. 8D
FIG. 8E

SYSTEMS AND METHODS FOR PROVIDING ADVANCED SPRINGS

CROSS-REFERENCE TO RELATED APPLICATION

This application is a continuation-in-part of U.S. patent application Ser. No. 17/093,471, filed Nov. 9, 2020, and entitled "SYSTEMS AND METHODS FOR PROVIDING AN ADVANCED SPRING"; the entire disclosure of which is hereby incorporated by reference.

BACKGROUND OF THE INVENTION

1. Field of the Invention

The present invention relates to springs. In particular, some implementations relate to systems and methods for providing an advanced or a supercoil spring. While the described spring can include any suitable feature, in some cases, it includes a coil spring having multiple external coils that define a portion of an inner lumen of the coil spring. In some such case, the coil spring further includes a first internal coil that extends at least partially into the inner lumen of the coil spring. In some cases, the external coils and the first internal coil are each made of, and comprise part of, one single continuous spring wire. In some cases, the coil spring includes a tension spring such that surfaces of adjacent external coils contact each other, and such that the first internal coil is disposed within a portion of the inner lumen defined by the adjacent external coils, when the coil spring is at rest.

2. Background and Related Art

There is a wide variety of different spring types, including tension springs, compression springs, torsion springs, constant springs, variable springs, variable stiffness springs, flat springs, machined springs, serpentine springs, garter springs, cantilever springs, coil or helical arc springs, hairsprings or balance springs, leaf springs, V-springs, Belleville springs, constant-force springs, ideal springs, main springs, negator springs, progressive rate coil springs, and wave springs, just to name some.

Generally speaking, a spring comprises an elastic material that is configured to store mechanical energy when the spring is stretched, compressed, twisted, deflected, or otherwise caused to change its configuration. Although springs can function in several different ways, in some cases, when a spring is forced from its original (or resting) configuration to a different configuration (e.g., by stretching, compressing, twisting, deflecting, and/or otherwise changing the spring's configuration) the spring exerts an opposing force that is roughly proportional to a change in the configuration of the spring (e.g., to a change in a length, rotational orientation, and/or deflection of the spring).

Springs can be used to perform a wide variety of functions. For instance, springs can be used to help: correct flaws in teeth and dental arches (e.g., through the use of dental braces, headgear, spacers, and/or any other suitable components that couple to one or more springs); return one or more objects (e.g., doors, garage doors, tire rippers, valves, and/or any other suitable objects) to a desired position; provide power to an object when one or more springs are actuated (e.g., in an analog clock or watch having a spring that is wound); reduce shocks or vibrations (e.g., in vehicles' suspension systems, in shock absorbers); selectively hold an object in a desired position (e.g., in a glass lift support on a vehicle's window), and/or for virtually any other suitable purpose.

While springs can be very useful for a variety of purposes, some conventional springs are not without their shortcomings. In this regard, some conventional springs, are configured to store a relatively small amount of mechanical force in relation to the size of the springs. Moreover, in some cases, a particular use may require the strength of multiple springs while only having space for one spring. Additionally, in some cases, in order to get the desired strength, compression, or extension length, a particular application may require a larger and/or longer spring than what is capable of fitting into that particular application.

Thus, while techniques currently exist that are used to provide springs for a variety of purposes (e.g., to correct flaws in teeth and dental arches through the use of dental braces, to help return objects to a desired position, and/or for many other purposes), challenges still exist with some conventional spring technologies, including those challenges listed above. Accordingly, it would be an improvement in the art to augment or even replace current techniques with other techniques.

SUMMARY OF THE INVENTION

The present invention relates to springs. In particular, some implementations relate to systems and methods for providing an advanced spring. While the described spring can include any suitable feature, in some cases, it includes a coil spring having multiple external coils that define a portion of an inner lumen of the coil spring. In some such cases, the coil spring further includes a first internal coil that extends at least partially into the inner lumen of the coil spring. In some cases, the external coils and the first internal coil are each made of, and comprise part of, one single continuous spring wire. In some cases, the coil spring includes a tension spring in which one or more surfaces of adjacent external coils contact each other, and in which the first internal coil is disposed within a portion of the inner lumen defined by the adjacent external coils, when the coil spring is at rest.

In some implementations, the present invention relates to an advanced (or supercoil) spring that includes: a coil spring that has a first external coil and a second external coil that together define a portion of an inner lumen of the coil spring; and a first internal coil that is coupled to, and flanked by, the first external coil and the second external coil and that extends at least partially into the portion of the inner lumen of the coil spring that is defined by the first external coil and the second external coil. In some such implementations, the first external coil, the second external coil, and the first internal coil are each made of, and comprise part of, one single continuous spring wire. Moreover, in some such implementations, the first external coil and the second external coil have substantially the same outer dimensions. Furthermore, in some cases, the coil spring includes at least one of: (a) a tension spring in which a surface of the first external coil contacts a surface of the second external coil when the coil spring is at rest such that a portion of the first internal coil is disposed within the portion of the inner lumen that is defined by the first external coil and the second external coil when the coil spring is at rest; and (b) a compression spring in which the surface of the first external coil is configured to contact the surface of the second external coil when the coil spring is compressed such that a portion of the first internal coil is disposed within the portion of the inner lumen that is defined by the first external coil and the second external coil when the coil spring is compressed.

In still other implementations, the described advanced (or supercoil) spring includes: coil spring having a first external coil; a second external coil (wherein a surface of the first external coil contacts a surface of the second external coil when the coil spring is at rest such that the first external coil and the second external coil define a portion of an inner lumen of the coil spring); and a first internal coil that is coupled to and that is contiguous with the first external coil and the second external coil. In some such implementations, the first internal coil extends into, and is at least partially disposed within the portion of the inner lumen that is defined by the first external coil and the second external coil. Additionally, in some such implementations, the first external coil and the second external coil each have a first radius of curvature (and/or any other suitable dimension) of a first size (e.g., of the same size), and the first internal coil has a second radius of curvature (and/or any other suitable dimension) that is smaller than the first radius of curvature (or dimension of the first external coil). Moreover, in some such implementations, the first external coil, the first internal coil, and the second external coil are each made of, and comprise part of, one single continuous spring (or resilient) wire.

In addition to the aforementioned features, the described advanced spring can include any suitable feature. Indeed, in some cases, it includes a first coil spring (e.g., a tension spring and/or a compression spring), a first coupler that is disposed at a first end of the first coil spring and that is configured to couple to any suitable object (e.g., a first anchor that is coupled to a first dental arch). In some cases, the advanced spring further comprises a second coupler that is disposed at a second end of the first coil spring and that is configured to couple to any other suitable object (e.g., a second anchor that is coupled to a second dental arch). In some cases, the first coil spring, the first coupler, and the second coupler all comprise one continuous wire. In some cases, the advanced spring (e.g., the first tension coil) tapers at its first and/or second ends. Indeed, in some cases, the advanced spring (e.g., the coil spring) tapers between a portion of the coil spring that has a widest outer diameter and/or outer width (e.g., a center portion of a length of the coil spring) and the first coupler (at the first end) and the second coupler (at the second end).

With continued reference to the advanced spring, the advanced spring can have any suitable component or characteristic. For instance, the advanced spring (e.g., the coil spring portion of the advanced spring) can have any suitable shape. Indeed, in some implementations, circular or helical coils in the coil spring provide that spring with a cylindrical shape. In some other implementations, however, instead of being cylindrical, the coil spring portion of the advanced spring has a prismatic shape, being substantially D-shaped, triangular, rectangular, square, elliptical, oval, polygonal, C-shaped, egg-shaped, rounded-raindrop shaped, and/or any other suitable prismatic shape.

The spring (or resilient) wire that is used to create the advanced spring can also have any suitable cross-sectional shape (e.g., when taken at a cross-section that is perpendicular to a length of the wire when straight and before it is coiled). Some non-limiting examples of suitable shapes of the wire include cross-sectional shapes that are substantially circular, elliptical, ovular, square, rectangular, triangular, polygonal, rounded raindrop, C-shaped, D-shaped, symmetrical, asymmetrical, and/or any other suitable shape.

The advanced spring (e.g., coil spring portion of the advanced spring) can have any suitable outer diameter or width (where the coil spring is not cylindrical), and/or other suitable dimensions. In some implementations, the coil spring of the advanced spring has a maximum outer diameter that is between about 1 mm and about 2 m, or within any subrange thereof. Indeed, in some implementations, the coil spring portion of the advanced spring has a maximum outer diameter and/or width that is between about 1 mm and about 30 cm, or within any subrange thereof.

Additionally, in some implementations in which the advanced spring is configured to be used in a human mouth (e.g., with braces) or for any other application requiring a relatively small spring, the advanced spring has a maximum outer diameter or width that is less that about 6 mm (or any suitable amount smaller). Indeed, in some such implementations, the maximum outer diameter of the advance spring is less than about 4 mm (e.g., about 3 mm±1.5 mm). Similarly, in some cases in which the advanced spring has a rectangular prismatic shape, the coil spring portion of the advanced spring is about 4 mm (±1.5 mm) by about 2 mm (±1.5 mm), along a length of the advanced spring.

In some cases, the coil spring portion of the advanced spring comprises a closed coiled spring in which the spring's coils are tightly wound such that multiple coils in the advanced spring contact each other when the spring is at rest (e.g., the coils have a low pitch). In some other cases, however, the coil spring portion of the advanced coil spring comprises an open coil spring, or the spring has relatively loosely wound coils such that the spring has spaces between at least some of the coils when the spring is at rest (e.g., the coils have a high pitch).

In some cases, the coil spring portion of the advanced spring comprises a tension spring that is configured to be stretched from (e.g., to be pulled to be longer than) its resting configuration. Additionally, in some cases, the advanced spring comprises a compression spring that is configured to be compressed from (e.g., to be forced to be shorter than) its resting configuration.

While the entire advanced spring (e.g., the spring and its couplers) can be any suitable size, in some implementations, the entire length of the advanced spring (at rest) is between about 2 mm and about 100 m, or within any subrange thereof. Indeed, in some implementations, the entire length of the advanced spring at rest (e.g., from end to end) is between about 2 mm and about 2.5 m. Moreover, in some implementations (e.g., where the advanced spring is used in a human mouth), an entire length of the advanced spring is between about 2 mm and about 40 mm (or within any subrange thereof). Indeed, in some implementations, the entire length of the advanced spring (e.g., from an end of the first coupler to an end of the second coupler) is less than about 30 mm. Indeed, in some cases, the entire length of the resting spring (e.g., when the spring is configured to be used in a user's mouth) is about 27 mm. In other cases, the advanced spring (when resting) is about 23 mm in length. In still other implementations, the advanced spring (when resting) is about 20 mm long.

With reference to the couplers, the advanced spring can comprise any suitable type or types of couplers that allow it to be coupled to one or more objects. Some non-limiting examples of suitable couplers include, but are not limited to, one or more hooks, threaded engagements, carabiners, loops, catches, clips, anchors, frictional engagements, mechanical engagements, enlarged portions, apertures, bends, links, joints, ties, connectors, attachments, fasteners, junctions, interfaces, rings, and/or any other suitable couplers. Indeed, in some implementations, one or more the advanced spring's couplers comprise a loop (e.g., a loop formed from and/or a bent portion of the advanced spring; and or any other suitable loop).

Where the advanced spring comprises one or more couplers, the couplers can be connected to the coil spring portion of the advanced spring in any suitable manner, including, without limitation, by being integrally formed with, being welded to, being clamped to, being fastened to, being linked to, being belted to, being bound to, being crimped to, and/or otherwise being coupled to the advanced spring. Indeed, in some implementations, one or more couplers comprise a portion of the continuous spring wire that is used to form the advanced spring.

Where the advanced spring comprises one or more couplers, the couplers (e.g., the first and second couplers) can have any suitable component, configuration, and/or characteristic that allows the couplers to couple the described advanced spring one or more desired objects and/or locations (e.g., to one or more anchors and/or to any other suitable object). For instance, some implementations of the couplers extend from the advanced spring so as to be parallel with a longitudinal or radial axis of the coil spring portion of the advanced spring (e.g., with a coupler extending near the longitudinal axis of, at a lateral side of, and/or from any other suitable portion of the coil spring portion).

In some other implementations, one or more of the couplers are curved, bent, bowed, and/or otherwise diverge laterally from the longitudinal, central, or radial axis of the coil spring portion of the advanced spring. In some such implementations, the first and second couplers diverge to the same lateral side of the coil spring portion of the advanced spring, such that the couplers are configured to couple the advanced spring to multiple objects (e.g., anchors on braces and/or to any other suitable object) while helping to hold a portion of the advanced spring away from one or more other objects (e.g., archwires, gums, machinery, a framework, and/or other objects that could interfere with the advanced spring as it functions).

Where the first and/or second couplers are formed from the same continuous wire as the coil spring portion of the advanced spring, the couplers can each extend from the coil spring in any suitable location and manner. Indeed, in some implementations, a portion of the continuous wire forms a coupler by extending away from an end of the coil spring, beginning near the longitudinal or radial axis of the coil spring, and bending to form a loop. In some such implementations, after forming the loop, an end of the continuous wire extends back into a lumen of the coil spring and/or is coupled to a portion of the advanced spring (e.g., to a one or more coils of the coil spring portion of the advanced spring).

In some other implementations, a radial axis of one or more coils of the coil spring portion of the advanced spring that act as a coupler are offset from the longitudinal, radial, or central axis of a majority of the coils in the coil spring. Where the radial axis of the coupler (or a coupler coil or coils) is offset from the radial (or longitudinal) axis of the majority of the coils of the coil spring, the two axes can be offset from each other by any suitable angle. Indeed, in some cases, when the advanced spring is at rest, the radial axis of the first and/or second couplers (or coupler coils) run substantially perpendicular to the longitudinal or radial axis of the majority of the coils in the coil spring portion of the advanced spring.

In some implementations, in addition to the first coil spring, the first coupler, and the second coupler, the advanced spring further includes a second coil spring having its own first end and second end. In some such implementations, the advanced spring optionally includes a third coupler that is configured to couple to any suitable object (e.g., the same dental arch as the first coupler; and/or to any other suitable location). Additionally, in some such implementations, the second coupler is disposed at the first end of the second coil spring and the third coupler is disposed at the second end of the second coil spring. Moreover, in some such implementations, the first coupler, the first coil spring, the second coupler, the second coil spring, and the third coupler optionally comprise the one continuous wire. While such an advanced spring can have any suitable shape, in some cases, it has a V-shaped appearance.

In addition to the foregoing, the described advanced spring can be modified in any suitable manner. Indeed, in some cases, in addition to having a first and/or second coil spring, some implementations of the advanced spring have 3, 4, 5, 6, or more coil springs. Moreover, in some cases, in addition to having a first, second, and/or third coupler, some implementations of the advanced spring have 4, 5, 6, 7, or more couplers.

For instance, in addition to the first and second couplers that respectively extend from the first and second ends of the first coil spring, some implementations of the described advanced spring include a second and third coil spring. Moreover, some such implementations include a third and fourth coupler, with the second coupler being disposed between the first and second coil springs, the third coupler being disposed between the second and third coil springs, and the fourth coupler being disposed at an end of the third coil spring. In this regard, while some implementations of the described advanced spring comprise multiple wires or other components that are coupled together, in some implementations, the first coupler, the first coil spring, the second coupler, the second coil spring, the third coupler, the third coil spring, and the fourth coupler are all formed from one continuous wire.

The described advanced spring can be used in any suitable manner. In this regard, some implementations of the advanced spring are configured for use in machinery, garage door mechanisms, shocks, struts, timepieces, trampolines, door closures, closing devices, pens, mattresses, toys, diving boards, locks, vehicles, seats, furniture, guns, firearms, pogo sticks, pop-open devices, spring-loaded devices, and/or for any other suitable use.

In some non-limiting implementations, the described advanced spring can be used to replace dental elastics (e.g., Class II elastics, Class III elastics, Class II triangle elastics, Class III triangle elastics, seating elastics, V elastics, triangle elastics, box elastics, canine elastics, and any other suitable type of elastics). In this regard, while the described advanced springs can couple to braces in any suitable manner, in some implementations, they couple to any suitable anchor on the braces and/or archwires (e.g., one or more pre-formed or custom archwires helices, archwire loops, stops, hooks, soldered hooks, crimpable hooks, drop in hooks, posts, crimpable posts, metal ligature tie hooks (such as a Kobayashi tie), pins, drop in pins, clasps, bands, cleats, lugs, buttons, eyelets, wings, brackets, and/or any other suitable object or objects that are capable of coupling a coupler of the advanced spring to a portion of a dental brace and/or to a dental arch). Indeed, in some cases, the first or second coupler is coupled to a dental bracket via a hook and/or any other suitable element. In some such cases, an archwire is disposed on and/or in the bracket and an archwire coupler (e.g., an elastic or metal ligature, elastic or metal single tie, metal ligature tie hooks (such as a Kobayashi tie), pin, twisted wire, braided wire, laced wire, elastic thread, power chain, and/or any other suitable coupler that is configured to couple the archwire to the bracket and/or any other suitable portion of a brace) is used to secure the archwire to the bracket (or elsewhere). More specifically, in some such cases, a portion of the first or second coupler is sandwiched between a portion of the archwire and a portion of the archwire coupler so as to couple the advanced spring to the bracket. Thus, in some implementations, the advanced spring is configured to remain in place during the interval between visits to an orthodontist's office. Thus, unlike some conventional orthodontic elastics that are regularly removed (e.g., when they break, when they lose their elasticity, during meals, etc.) and are not immediately replaced (e.g., due to forgetfulness and/or a lack of desire), some implementations of the described advanced spring are configured to retain their elasticity and remain in place for extended periods of time. As a result, some such implementations are able to provide the desired orthodontic results more quickly and/or more effectively than may be achieved with some conventional elastics.

While some implementations of the described advanced spring can be particularly useful with traditional metal braces that include an orthodontic archwire that is coupled to multiple brackets, which are in turn coupled to multiple teeth, the described advanced spring can be used with any other suitable type of braces and/or orthodontic equipment. Indeed, in some implementations, the described advanced spring is used with ceramic braces, lingual braces, clear plastic aligners (e.g., INVISALIGN™ orthodontics), tooth bands, self-ligating braces, bars, arms, occlusal correctors (such as a Carriere appliance), Class II correctors, Class III correctors, holding arches, lip bumpers, space maintainers, Wilson arches, retainers, anti-snoring devices, mouth guards, night guards, growth modification devices, temporary anchorage devices (TAD), headgear systems, and/or any other suitable type of orthodontic equipment in which the first coupler of the described advanced spring is able to couple to a first anchor and the spring's second coupler is able to couple to a second anchor to help move and/or align teeth and/or dental arches and/or to correct dental occlusion.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the described systems and methods will be rendered by reference to specific embodiments thereof, which are illustrated in the appended drawings. Understanding that the drawings depict only representative embodiments of the present invention and are not, therefore, to be considered as limiting the scope of the invention, the present invention will be described and explained with additional specificity and detail through the use of the accompanying drawings in which:

FIGS. 3A-3F depict cross-sectional views of various embodiments of the advanced spring;

FIGS. 4A-4G depict some cross-sectional views of a wire that is used to create the advanced spring in accordance with some embodiments;

FIGS. 8D-8E each show a partial cross-sectional view where the coil spring comprises the continuous wire that forms both the outer coil and the inner coil in accordance with some representative embodiments;

DETAILED DESCRIPTION OF THE INVENTION

The present invention relates to springs. In particular, some embodiments relate to systems and methods for providing an advanced (or a supercoil) spring. While the described advanced spring can include any suitable feature, in some cases, it includes a coil spring having multiple external coils that define a portion of an inner lumen of the coil spring. In some such case, the coil spring further includes a first internal coil that extends at least partially into the inner lumen of the coil spring. In some cases, the external coils and the first internal coil are each made of, and comprise part of, one single continuous spring wire. In some cases, the coil spring includes a tension spring in which surfaces of adjacent external coils contact each other, and such that the first internal coil is disposed within a portion of the inner lumen defined by the adjacent external coils, when the coil spring is at rest.

The described advanced spring can be used in any suitable location, including, without limitation, in machinery, garage door opening/closing mechanisms, shocks, struts, timepieces, trampolines, door closures, closing devices, pens, mattresses, toys, diving boards, locks, vehicles, seats, furniture, guns, firearms, traps, triggers, pogo sticks, pop-open devices, spring-loaded devices, and/or for any other suitable use. Moreover, in accordance with some embodiments, the advanced spring can have one or more features that can make it ideal for use in a patient's mouth (e.g., to replace orthodontic elastics). In this regard, while the advanced spring can be used in absolutely any suitable application, some non-limiting examples in which the advanced spring is used for orthodontic purposes are set forth herein for illustration purposes.

With regard to the foregoing, when a patient wears braces, one or more additional auxiliary appliances (e.g., orthodontic elastics, comprising latex and/or or non-latex elastic bands) are often prescribed by the orthodontist for the correction of the patient's bite (occlusion). The patient (and/or a caregiver) then is responsible to connect fresh elastics to the braces or archwires multiple times a day.

Figure 1A:
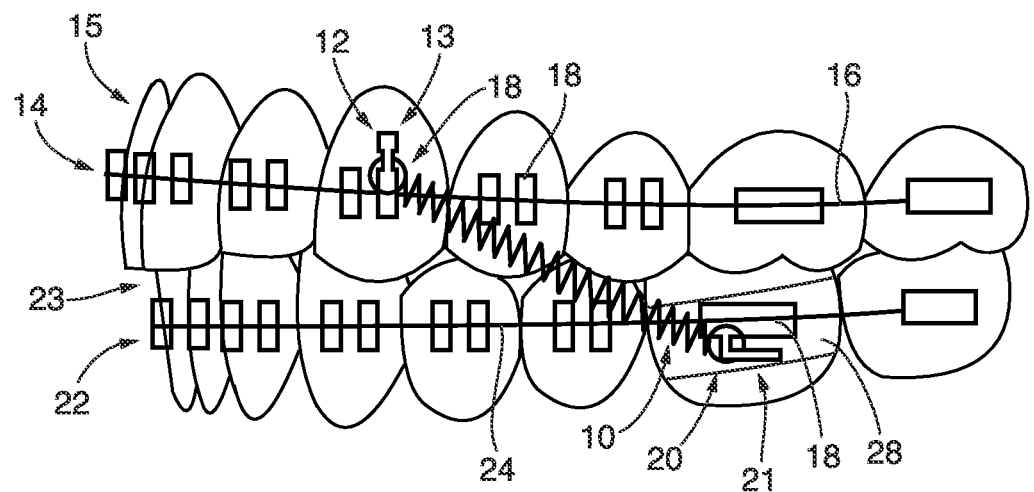
FIGS. 1A-1D each depict a side view of a maxilla (or upper dental arch) and a mandible (or lower dental arch) that each have dental braces and/or a Carriere appliance, wherein an advanced spring extends from the braces and/or appliance on the maxilla to the braces and/or appliance on the mandible in accordance with some representative embodiments.

In some representative embodiments, the described advanced spring is configured to replace orthodontic elastics that extend from braces on an upper jaw (or upper dental arch or maxilla) to braces on a lower jaw (or lower dental arch or mandible) of a patient. By way of non-limiting illustration, FIG. 1A shows that, in some embodiments, the described advanced spring 10 is configured to extend between: (a) a first anchor 12 on an upper set of braces 14 on an upper dental arch 15, with the upper braces comprising a first archwire 16 and multiple orthodontic brackets 18 and (b) a second anchor 20 on a lower set of braces 22 on a lower dental arch 23, with the lower braces comprising a second archwire 24 and additional brackets 18.

The advanced spring 10 can couple to any suitable object or objects (including, without limitation, to one or more levers, frames, shocks, toys, pens, pogo sticks, machines, vehicles, orthodontic anchors, tools, movable objects, doors, and/or to any other suitable item or items). In some embodiments in which the advanced spring is configured to be used in a patient's mouth, the described advanced spring 10 is configured to couple to one or more anchors (e.g., anchors 12 and 20) on an upper 15 and/or lower 23 dental arch of a patient. In such embodiments, the anchors can comprise any suitable component that is configured to be coupled to the advanced spring (e.g., via a coupler on the advanced spring). Some examples of suitable anchors (or advanced spring anchors) include, but are not limited to, one or more hooks, sliding hooks, spring-loaded sliding hooks, wire hooks, bracket hooks, crimpable hooks, crimpable ball hooks, crimpable split bi-directional ball hooks, ball hooks, K-hooks, catches, traction hooks, clasps, poking hooks, posted archwires, crimpable stops, Carriere appliances, pre-formed or custom archwire helices, archwire loops, stops, hooks, soldered hooks, crimpable hooks, drop in hooks, posts, crimpable posts, metal ligature tie hooks (such as a Kobayashi tie), pins, drop in pins, clasps, bands, cleats, lugs, buttons, eyelets, wings, bars, arms, occlusal correctors (such as a Carriere appliance), Class II correctors, Class III correctors, holding arches, lip bumpers, space maintainers, Wilson arches, retainers, anti-snoring devices, mouth guards, night guards, growth modification devices, temporary anchorage devices (TADs), and/or any other suitable fasteners that are configured to couple the described advanced spring to a portion of an upper and/or lower dental arch of a patient.

Figure 1B:
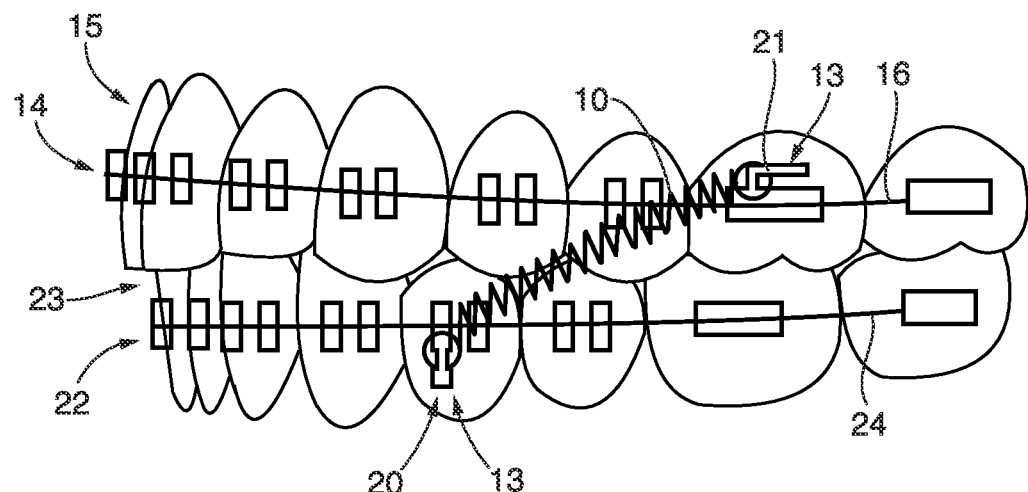
Figure 1C:
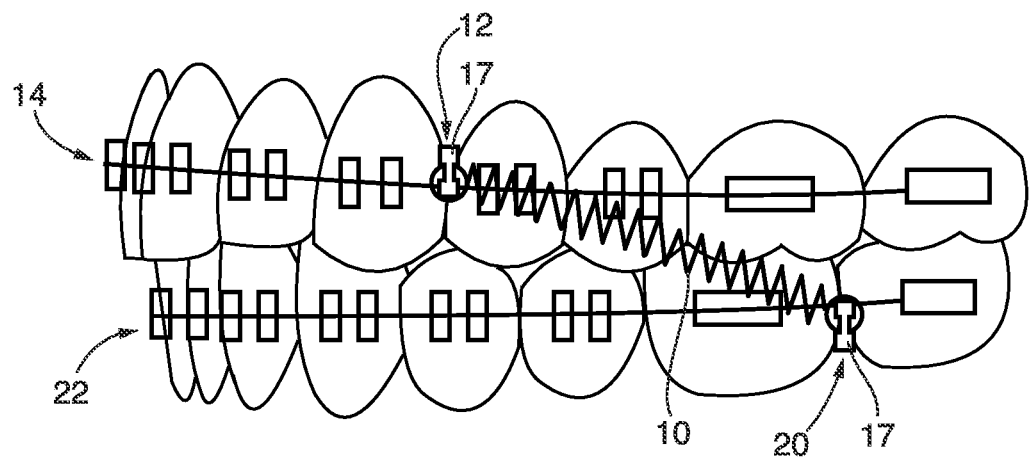
Figure 1D:
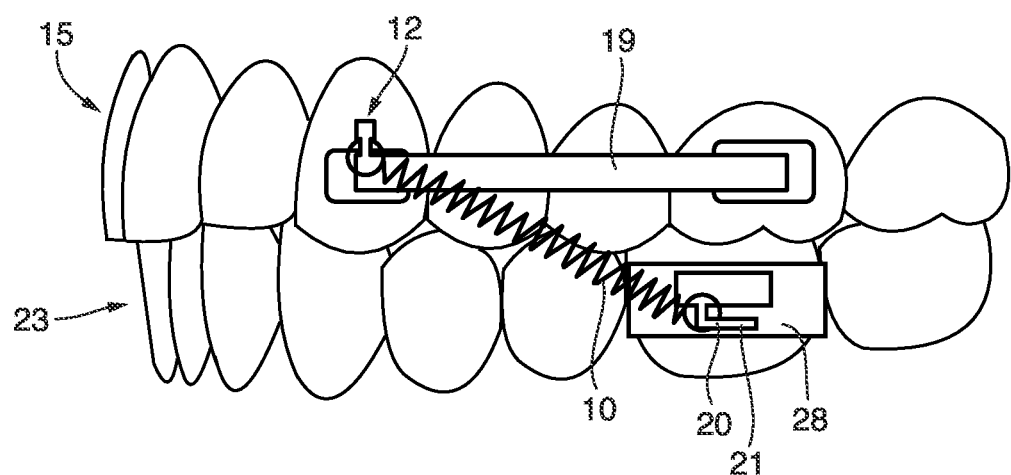

By way of non-limiting illustration, FIG. 1A shows an embodiment in which the advanced spring 10 is coupled to a ball hook 13 that functions as the first anchor 12 and to a poking hook 21 that functions as the second anchor 20. Similarly, FIG. 1B shows an embodiment in which the advanced spring 10 is coupled to a first anchor 12 (e.g., a poking hook 21) on the upper dental arch 15, and to a second anchor 20 (e.g., a ball hook 13) on the lower dental arch 23. Additionally, FIG. 1C shows (by way of non-limiting illustration) an embodiment in which the advanced spring 10 extends between a first 12 and a second 20 anchor, wherein one or more of the anchors comprises a posted archwire 17 (e.g., a hook directly soldered to an archwire) and/or to a crimpable stop (e.g., an anchor that is crimped onto an archwire). Moreover, FIG. 1D shows (by way of non-limiting illustration) an embodiment in which the advanced spring 10 is coupled to a first anchor 12 on a Carriere appliance 19 (e.g., an arm of metal, ceramic, and/or any other suitable material that is bonded to one or more teeth (e.g., the first molar and the canine and/or any other suitable tooth)) that is on a first dental arch (e.g., the upper dental arch 15) and to a second anchor 20 (e.g., a poking hook 21) on an orthodontic band 28. In short, the advanced spring can be coupled to any suitable anchors and/or any other suitable object, at any suitable angle, and in any other suitable manner.

Where the advanced spring 10 couples to one or more anchors (e.g., the first 12 and/or second 20 anchors), the anchors can be coupled to any other suitable component that allows the anchors to be coupled to one or more teeth and/or dental arches. Indeed, in some embodiments, one or more anchors are coupled to one or more orthodontic brackets, molar bands, buccal tubes, orthodontic bands, orthodontic archwires (e.g., archwires 16 and 24), clear aligners, orthodontic retainers, headgear components, bars, arms, occlusal correctors (such as Carriere appliances), Class II correctors, Class III correctors, holding arches, lip bumpers, space maintainers, Wilson arches, anti-snoring devices, mouth guards, night guards, growth modification devices, temporary anchorage devices (TADs), and/or any other suitable components that are configured to directly or indirectly couple one or more anchors to one or more of a patient's teeth or dental arches. By way of non-limiting illustration, FIG. 1A shows an embodiment in which the first anchor 12 is coupled to an orthodontic bracket (or bracket) 18 and in which the second anchor 20 is coupled to a bracket 18 and/or an orthodontic band 28. Thus, in some embodiments, the described advanced spring is configured to be used with one or more conventional coupling devices that are made for orthodontic elastics. Accordingly, in some such embodiments, the described advanced spring can easily be used interchangeably with one or more orthodontic elastics.

Figure 2A:
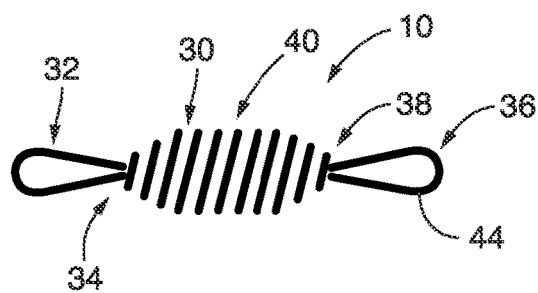
FIGS. 2A-2D show front elevation views of different representative embodiments of the advanced spring.
Figure 2B:
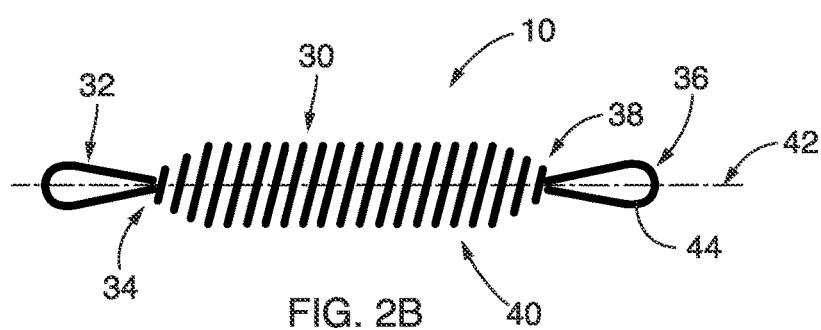

With specific reference now to the advanced spring 10 itself, the advanced spring can comprise any suitable component or characteristic that allows it to be used to resist being stretched (e.g., where the advanced spring comprises a tension spring), to resist being compressed (e.g., where the advanced spring comprises a compression spring), and/or to resist being twisted (e.g., where the advanced spring comprises a torsion spring). By way of non-limiting illustration, FIG. 2A shows that, in some embodiments, the advanced spring 10 comprises one or more coil springs 30 (e.g., tension springs, torsion springs, and/or compression springs) that have a first coupler 32 disposed at a first end 34 of the coil spring 30 and a second coupler 36 disposed at a second end 38 of the coil spring 30 of the advanced spring 10.

With respect to the coil spring 30 portion of the advanced spring 10, the coil spring can have any suitable characteristic that allows the advanced spring 10 to function as described herein. For instance, the coil spring can have any suitable shape that allows the advanced spring to function as described. In some embodiments, a portion of the coil spring has a cylindrical shape, an elliptical straw shape, a rectangular prismatic shape, a square prismatic shape, a triangular prismatic shape, a polygonal prismatic shape, a C-Shaped prismatic shape, a D-shaped prismatic shape, an egg-shape, a teardrop-shape, a pill shape, an undulated cylindrical shape, a conical shape, a double conical shape comprising two conical portions that meet at a widest portion of the advanced spring, and/or any other suitable shape. By way of non-limiting example, FIGS. 2A-2D show some embodiments in which a portion of the coil spring 30 has a cylindrical portion 40 that optionally has tapered ends.

Additionally, FIGS. 3A-3F show that some embodiments of the coil spring 30 portion of the advanced spring 10 have a cross-sectional view (e.g., a face view when such cross-sectional view is taken perpendicular to a longitudinal (or radial) axis 42 of the coil spring 30) that is circular (e.g. as shown in FIG. 3A), square (e.g., as shown in FIG. 3B), D-shaped (e.g., as show in FIG. 3C), elliptical in shape (e.g., as shown in FIG. 3D), rectangular (e.g., as shown in FIG. 3E), crescent-moon shape (e.g., as shown in FIG. 3F), and/or any other suitable shape. In this regard, the shape of the coil spring can change from one application to another. Moreover, the shape of the coil spring can provide the advanced spring with one or more features. Indeed, in some cases, the advanced spring's shape helps the tension coil to fit in locations that have or require a set shape, to fit in tight places, and/or to serve any other suitable purpose. For example, in some embodiments in which the advanced spring is configured to be used in a patient's mouth, the shape of the coil spring can allow the advanced spring to function without causing pain to a patient's gums and/or cheeks. For instance, where the advanced spring is cylindrical, it can be free from having sharp corners that can dig into a patient's gums and/or inner cheeks. Similarly, in some embodiments in which the advanced spring has a D-shaped prismatic portion, a substantially flat portion of the length of the coil spring can be configured to face towards the patient's teeth and/or gums, while the rounded portion of the coil spring's length can face towards the patient's inner cheeks so as to be comfortable for the patient.

Figure 2C:
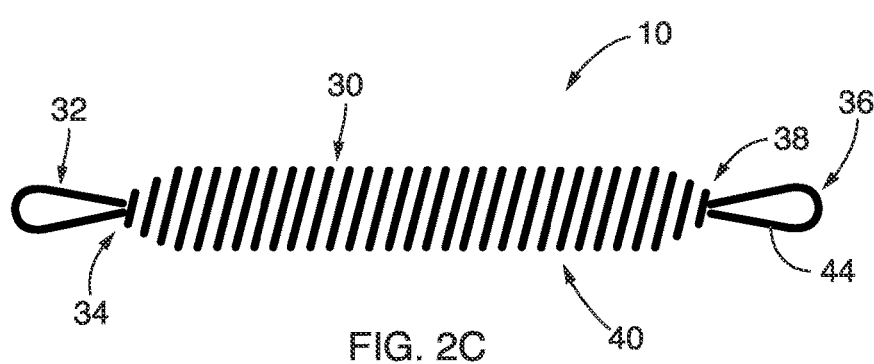
Figure 2D:
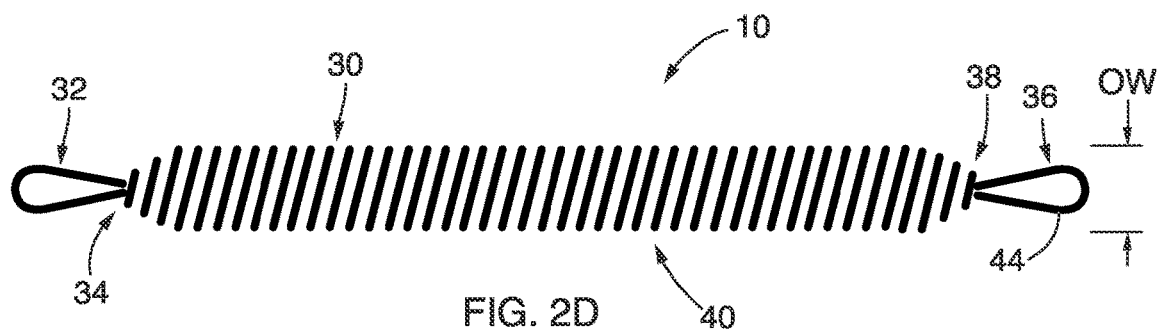
Figure 2E:
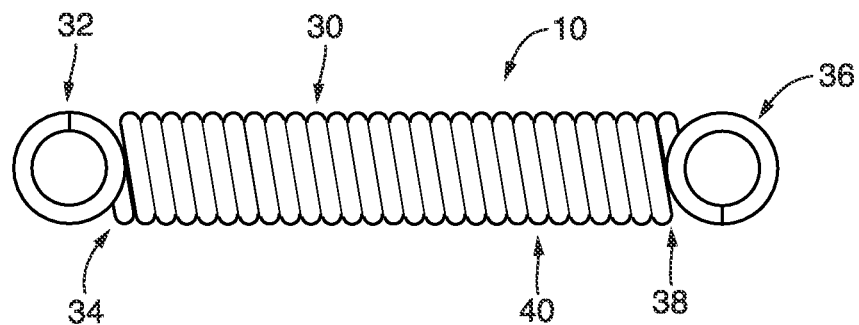
FIGS. 2E-2F respectively shows a front and a side elevation view of a representative embodiment in which the advanced spring comprises a closed coil tension spring.

In some embodiments, the coil spring 30 has a constant outer diameter (or width) along at least a portion of its longitudinal axis 42. By way of non-limiting illustration, FIGS. 2D and 2E show some embodiments in which a majority of a length of the coil spring 30 has a substantially constant outer diameter (or outer width OW, as shown in FIG. 2D).

Moreover, in some embodiments, the outer diameter (or outer width OW) of the coil spring 30 varies along one or more portions of coil spring's longitudinal axis 42. In this regard, the outer diameter or width of the coil spring portion of the advanced spring 10 can vary in any suitable manner, including, without limitation, by: tapering at one or more ends of the coil spring, expanding at one or more ends of the coil spring, tapering in the middle of the coil spring, and/or any other suitable manner. By way of non-limiting illustration, FIG. 2D shows that, in some embodiments, the first end 34 and second end 38 of the coil spring 30 are tapered (e.g., to help prevent the coil spring from being caught on an object near a coupler 32 and/or 36, such as one or more brackets 18, archwires 16, and/or other orthodontic components; frames; devices; and/or any other suitable object; to help make the advanced spring 10 comfortable on the cheeks, gums, and/or tongue of the patient; and/or to perform any other suitable function).

Where one or more ends (e.g., ends 34 and/or 36) of the coil spring 30 portion of the advanced spring 10 taper, the ends can taper in any suitable manner. Indeed, in some embodiments, the ends are tapered to have a conical shape, a hemispherical shape, a parabolic shape, a beehive shape, a pair shape, a pyramid shape, a fluted shape, a symmetrical shape, an asymmetrical shape, a polygonal shape, an irregular shape, and/or any other suitable shape. By way of non-limiting illustration, FIGS. 2A-2D show some embodiments in which the first 34 and second 38 ends of the coil spring 30 have a substantially parabolic and/or conical shape.

The coil spring 30 can have any suitable maximum outer diameter or outer width OW that allows the advanced spring to function as described herein—noting that the size of the advanced spring may vary from one application to another. In some embodiments, the maximum outer diameter or width of the coil spring portion of the advanced spring 10 is between about 1 mm and about 2 m, or within any subrange thereof. Indeed, in some implementations, the coil spring portion of the advanced spring has a maximum outer diameter and/or width that is between about 1 mm and about 30 cm, or within any subrange thereof (e.g., between about 2.5 mm and about 16 cm).

Additionally, in some embodiments in which the advanced spring 10 is configured to be used in a relatively small place (e.g., a human mouth, a watch, and/or in any other application requiring a relatively small spring), the coil spring portion 30 of the advanced spring has a maximum outer diameter or width that is any suitable amount less than about 8 mm. Indeed, in some embodiments, the maximum outer diameter of the coil spring is any suitable width less than about 6 mm. In some cases, for instance, the coil spring portion of the advanced spring has a maximum outer width of about 3 mm (±0.5 mm). In some other cases, the coil spring has a maximum outer diameter width of about 2 mm (±0.5 mm).

In some embodiments in which the coil spring 30 is not cylindrical, the coil spring can have any suitable dimensions that fall within the aforementioned outer widths OW. Indeed, in some embodiments in which the coil spring portion of the advanced spring 10 has a square prismatic shape (e.g., as shown in FIG. 3B), the coil spring has a maximum outer width OW that is between about 2 mm and about 2 m, or within any subrange thereof (e.g., less than about 30 cm, less than about 10 cm, or even less than about 2 cm). In some embodiments, in which the spring needs to be relatively small (e.g., for use in a mouth, watch, and/or in any other suitable application), the coil spring has an outer width of about 4 mm±1 mm (or any other suitable width) and a height OH of 2 mm±1 mm (or any other suitable width). In any case, different outer widths of the coil spring can give the advanced spring a variety of features. For instance, larger diameter coils can, in some embodiments, allow the spring to be used for large scale uses (e.g., in vehicles, trains, and/or in any other suitable applications). Additionally, in some cases, by having coils that are relatively large, some embodiments of the advanced spring can ensure that the patient would bite on the coil spring's coils less because the coils are relatively large and deflect out of an occlusion as the tension spring functions. Moreover, in some cases, in which the coil spring has relatively small diameter coils and in which the advanced spring is used in a patient's mouth, the coils can be configured to apply little to no pressure to a patient's gums and/or inner cheeks.

Figure 2F:
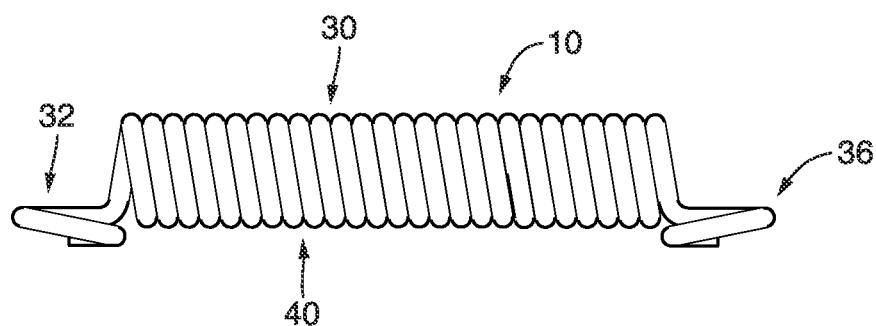
Figure 2G:
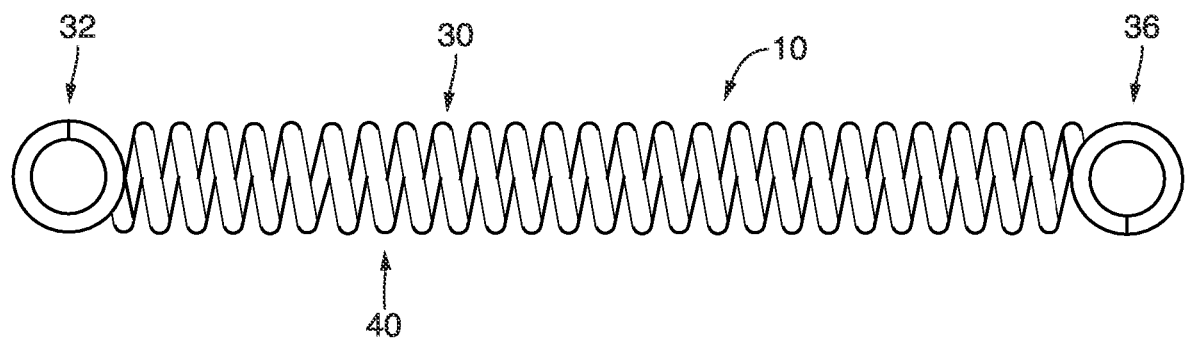
FIG. 2G shows a front elevation view of a representative embodiment in which the advanced spring comprises an open coil spring.

The coils in the coil spring 30 can have any suitable pitch that allows the advanced spring 10 to function as described herein. Indeed, in some embodiments, the advanced spring is wound so tightly that it comprises a closed coil spring, or spring that is wound so tightly that its coils have a relatively small pitch and contact each other when the spring is at rest. By way of non-limiting illustration, FIGS. 2E-2F show some embodiments in which the coil spring 30 comprises a closed coil spring (e.g., a tension coil).

In some other embodiments, however, the advanced spring 10 comprises an open coil spring, or a coil spring 30 having coils with a relatively large pitch such that there is a space between the coils when the spring is at rest. By way of non-limiting illustration, FIGS. 2A-2D and 2G show some embodiments in which the coil spring 30 (e.g., a tension and/or compression coil) comprises an open coiled spring. In this regard, by comprising an open coil spring, the coil spring can provide any suitable feature. For instance, in some embodiments, by maintaining a space between the coils when the spring is at rest, the advanced spring is configured to not capture and pinch portions of the patient's inner cheeks, tongue, and/or gums when the advanced spring operates. Additionally, in some embodiments in which the coil spring comprises an open coil, the spring is configured to be act as a compression and/or tension spring.

The coil spring 30 can be configured to exert any suitable amount of force that allows it to function as intended (e.g., to help lift a heavy garage door, to cushion the fall of an elevator, to be used in place of one or more orthodontic elastics, and/or for any other suitable purpose). In some embodiments, when the advanced spring 10 is stretched or compressed, the coil spring is configured to provide between about 1 gram/cm$^2$ and 99,000 metric tons/cm$^2$, or within any subrange thereof.

In some embodiments, the advanced spring 10 is configured to exert roughly the same amount of force as a dental elastic. In some such embodiments, when the advanced spring is used in a patient's mouth and is stretched under normal conditions (e.g., stretched to any suitable length that is less than about 50 mm, such as about 30 mm or less, depending on the length of the advanced spring) the coil spring 30 is configured to provide up to between about 1 gm/cm$^2$ and 300 gm/cm$^2$ of force (or any subrange thereof). Indeed, in some embodiments, when the advanced spring is stretched during use in a patient's mouth, the coil spring is configured to provide up to between about 55 gm/cm$^2$ and about 230 gm/cm$^2$.

The wire used to form the coil spring 30 (and/or any other suitable portion of the advanced spring 10) can have any suitable characteristic that allows the advanced spring to function as a spring and/or to otherwise function as described herein. For instance, the wire can be of any suitable thickness (e.g., diameter, width, and/or other suitable dimensions) that allows the advanced spring to function as described herein. In some embodiments, the wire 44 has a diameter and/or outer width of between 0.01 mm and about 30 cm, or within any subrange thereof (e.g., between about 0.1 mm and about 2.5 cm). Indeed, in some embodiments, in which the advanced spring is used in relatively small places (e.g., a patient's mouth), the spring wire has a maximum outer diameter or outer width OW (e.g., as shown in FIGS. 4A-4D) of between about 0.01 mm and about 2 mm (or within any subrange thereof). Indeed, in some embodiments, the wire has an outer diameter or width of about 0.25 mm 0.5 mm.

The wire 44 can comprise any suitable type of material or materials that can allow the advanced spring to function as described herein. Indeed, in some embodiments, the wire comprises one or more resilient wires, leaves, bars, ribbons, rods, coils, twists of multiple wires and/or other material, braid of multiple wires and/or any other suitable material, and/or other resilient material that is used to create the coil spring 30 and/or any other suitable portion of the advanced spring 10 (e.g., the first coupler 32, the second coupler, and/or any other suitable portion of the advanced spring). Indeed, in some embodiments, the wire comprises a braid of resilient wires. In some other embodiments, however, the wire comprises a piece of coiled wire, a coiled leaf, and/or any other suitable resilient material. By way of non-limiting illustration, FIG. 2C shows an embodiment that comprises a coiled resilient wire 44.

The wire 44 can have any suitable cross-sectional shape (e.g., cross-sectional shape that is taken perpendicular to a longitudinal axis of the wire when it is straight) that allows the advanced spring to function as intended. Some non-limiting examples of suitable cross-sectional shapes include a shape that is substantially circular, ovular, elliptical, rectangular, square, triangular, polygonal, C-shaped, D-shaped, rounded raindrop shape, symmetrical, asymmetrical, egg-shaped, pill-shaped, and/or any other suitable shape. By way of non-limiting illustration, FIGS. 4A-4G respectively show some embodiments in which the wire 44 has a circular, rectangular, elliptical, crescent-moon, elongated capsule, square, and D-shaped shape.

With reference now to the couplers (e.g., the first 32, second 36, and/or any other number of couplers), the couplers can comprise any suitable characteristic that allows them to couple the advanced spring 10 to any suitable object (e.g., one or more anchors 12 and 20, catches, doors, frames, and/or other suitable components). In some embodiments, the first and/or second coupler each comprise one or more loops, eyelets, grommets, hooks, clips, screws, threaded sockets, threaded engagements, carabiners, claps, catches, clips, frictional engagements, mechanical engagements, fasteners, junctions, interfaces, rings, bends in the wire 44, and/or any other suitable components that are configured to couple one or more advanced springs 30 to one or more objects (e.g., anchors 12 and/or 20).

Figure 6A:
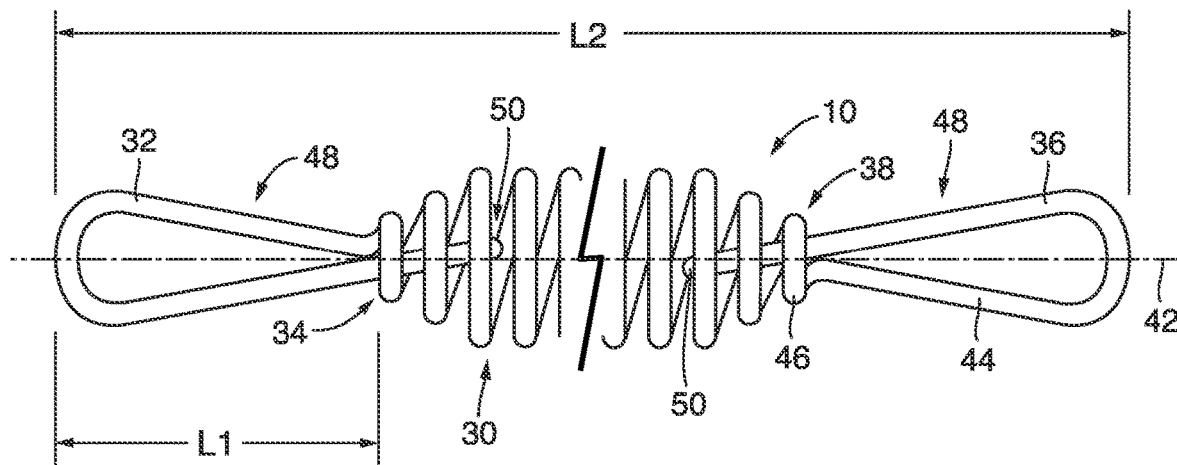
FIG. 6A depicts a front elevation view of the advanced spring in accordance with a representative embodiment.
Figure 6B:
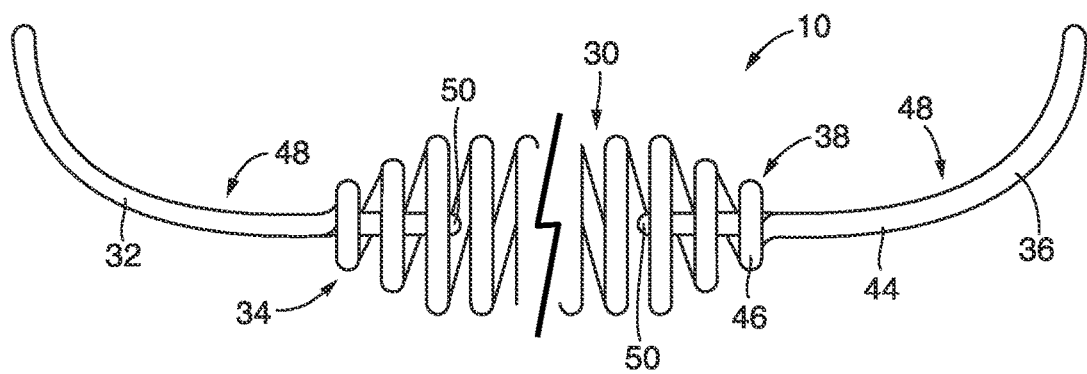
FIG. 6B depicts a side elevation view of the advanced spring in accordance with a representative embodiment.
Figure 7A:
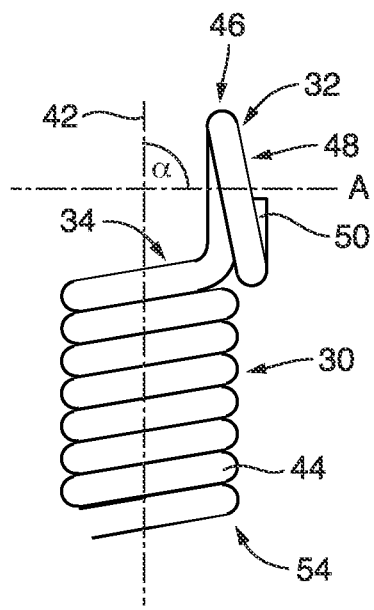
FIG. 7A depicts a side elevation view of an end of the advanced spring in accordance with a representative embodiment.
Figure 7B:
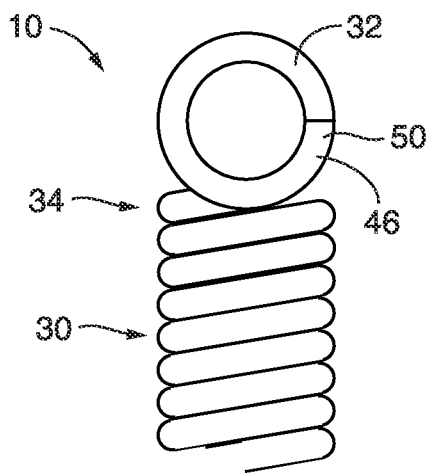
FIG. 7B illustrates a front elevation view of the end of the advanced spring of FIG. 7A.
Figure 7C:
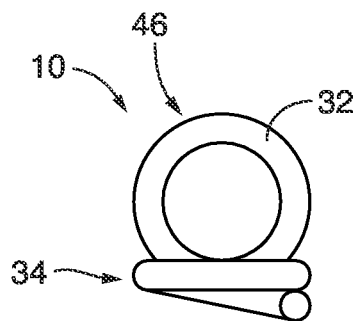
FIG. 7C illustrates a back elevation view of the end of the advanced spring of FIG. 7A.
Figure 7D:
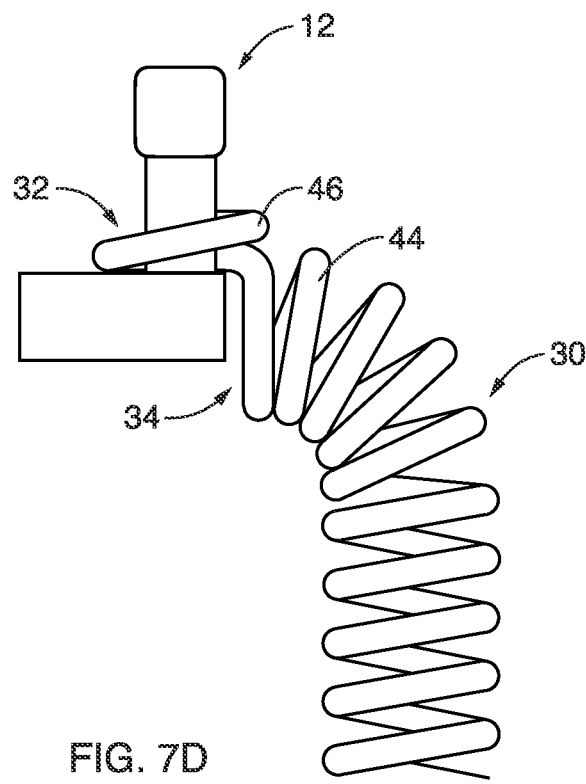
FIG. 7D illustrates a side elevation view of the advanced spring of FIG. 7A coupled to an anchor in accordance with a representative embodiment.
Figure 8A:
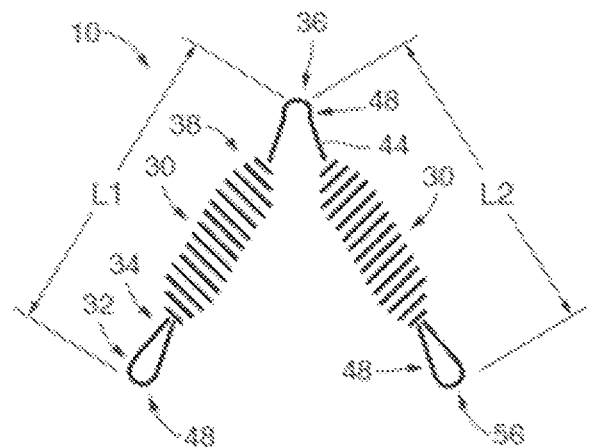
FIG. 8A depicts a side elevation view of a V-shaped advanced spring in accordance with a representative embodiment.

By way of non-limiting illustration, FIGS. 2A-2D, 5A-5B, and 6A-6B show some embodiments in which the first 32 and second 36 couplers each comprise a loop of the wire 44. Additionally, FIGS. 7A-7D show some embodiments in which one or more of the couplers (e.g., the first coupler 32) comprises one or more coils 46. Moreover, FIG. 8A shows an embodiment in which the second coupler 36 comprises a bend in the wire 44, with the bend being configured to be coupled to any suitable object (e.g., anchor 12 and/or 20).

In some embodiments, one or more of the couplers (e.g., the first 32, the second 36, and any other suitable coupler 48) comprise discrete components that are coupled together with the coil spring 30 (e.g., via crimping; bending; welding; clamping; catching; one or more frictional engagements, links, treaded engagements, mechanical engagements, catches, couplers, fasteners, belts, bindings, cables, chains, and/or any other suitable components; and/or in any other suitable manner). In some other embodiments, however, one or more of the couplers are integrally formed with the coil spring.

Figure 8B:
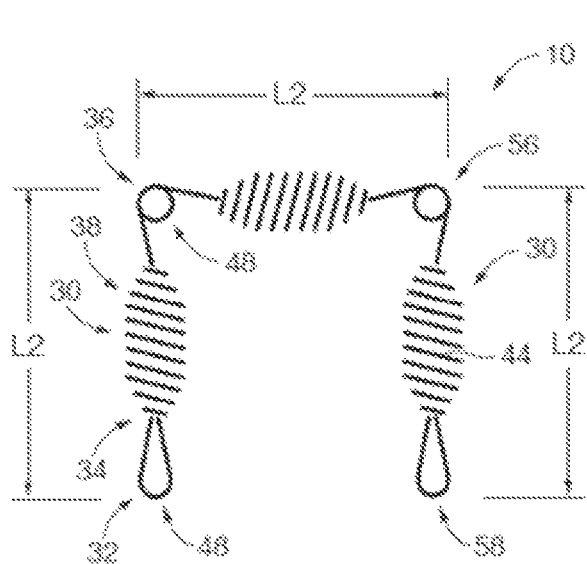
FIG. 8B illustrates a front elevation view of the advanced spring in accordance with a representative embodiment.

By way of non-limiting illustration, FIGS. 5A-7D show some embodiments in which the first coupler 32, the coil spring 30, and the second coupler 36 all comprises one continuous piece of wire 44. Similarly, FIGS. 8A-8B show some embodiments in which all of the components of the advanced spring 10 (including multiple coil springs 30 and more than two couplers 48, as discussed below) comprise one continuous wire 44.

Where the couplers 48 are integrally formed with the coil spring 30, the couplers can be formed in any suitable manner. Indeed, in some embodiments, a portion of the wire 44 extends from an end (e.g., end 34 and/or end 38) of the coil spring and is then bent back to form a hook, bend, loop, and/or any other suitable coupler. In some cases, when the wire bends back to form a hook (e.g., bends back towards the coil spring), a terminal end of the wire is coupled to the wire (e.g., wraps around, is welded to, and/or is otherwise coupled to the wire, one or more of the coils 46, a portion of the coupler, and/or to any other suitable portion of the advanced spring 10). In some other embodiments, however, a terminal end of the wire is not directly coupled back to a portion of the advanced spring. By way of non-limiting illustration, FIGS. 6A-6B show some embodiments in which the couplers 48 comprise a portion of the wire 44 that extends from the coil spring 30 and bends back such that a terminal end 50 of the wire 44 extends into a lumen 52 of the advanced spring (e.g., in past the closest coil 46 to the coupler) when the advanced spring is at rest. Additionally, FIG. 7A shows an embodiment in which the coupler 48 comprises a coil 46 having the terminal end 50 that ends on, and is disposed at, that coil 46.

The couplers 48 can extend from the coil spring 30 in any suitable manner that allows the advanced spring 10 to function as described herein. In some embodiments, one or more couplers are configured to extend from the advanced spring at and/or adjacent to the longitudinal axis 42 of the advanced spring. By way of non-limiting illustration, FIG. 6A shows an embodiment in which the first coupler 33 initiates and terminates adjacent to the longitudinal axis 42 of the coil spring 30.

In some other embodiments, however, the couplers 48 can be disposed in any other suitable location at one or more ends (e.g., ends 34 and/or 38) of the coil spring 30. For instance, FIG. 7A shows an embodiment in which a coupler 48 extends at and/or adjacent to a lateral perimeter 54 of the coil spring 30.

The couplers 48 can have any suitable configuration that allows them to couple the coil spring 30 to one or more objects (including, without limitation, to anchors 12 and 20). In some embodiments, a portion of the couplers are configured to extend perpendicular to the longitudinal axis 42 of the coil spring; to extend parallel to the longitudinal axis of the coil spring; to extend at an angle with respect to the longitudinal axis of the coil spring; to be bent, curve, bowed, leaned, and/or otherwise to diverge from the longitudinal axis of the coil spring (or at least from the longitudinal axis of the majority of the coils in the coil spring); and/or to have any other suitable configuration.

Figure 5A:
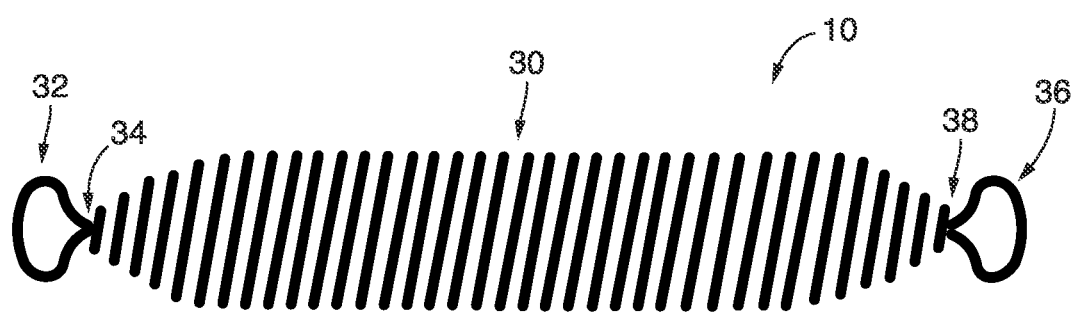
FIG. 5A depicts a front elevation view of the advanced spring in accordance with a representative embodiment.
Figure 5B:
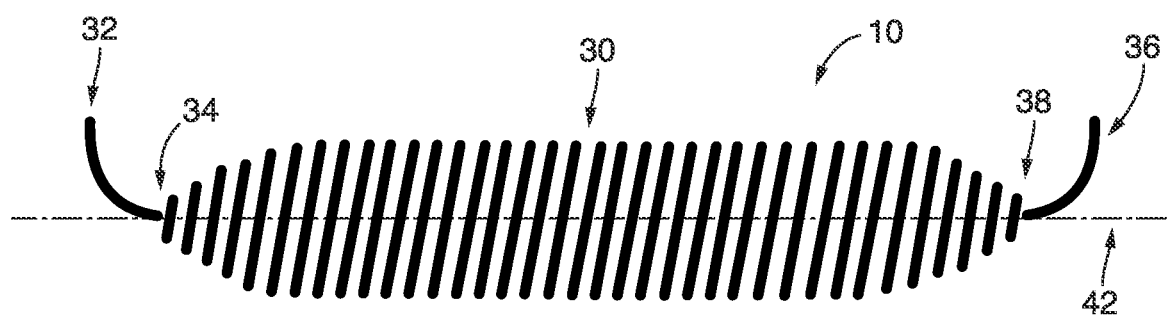
FIG. 5B illustrates a side elevation view of the advanced spring in accordance with a representative embodiment.
Figure 5C:
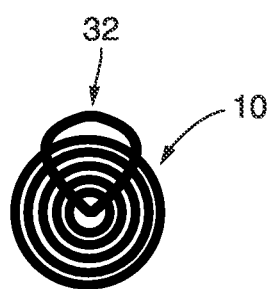
FIG. 5C depicts a plan, end (or face) view of the advanced spring in accordance with a representative embodiment.

By way of non-limiting illustration, FIGS. 5B and 6B show some embodiments in which one or more couplers 48 are configured to bend laterally away from the longitudinal axis 42 of the coil spring 30. In this regard, while the couplers (e.g., the first 32, second 36, and/or any other suitable coupler 48) can extend to any lateral side of the coil spring (including, without limitation, to different lateral sides of the coil spring), FIGS. 5B and 6B show some embodiments in which the first 32 and second 36 couplers each extend away from the longitudinal axis 42 of the coil spring 30 and towards the same lateral side of the tension spring 30. Thus, in some such embodiments, the advanced spring 10 can easily be coupled to two or more objects without getting in the way of those objects. For instance, that advanced spring can be coupled (in some embodiments) to a pair of braces (e.g., without twisting the advanced spring) and/or the couplers can help to hold the advanced spring away from the patient's gums and teeth.

In another non-limiting illustration, FIG. 7A shows an embodiment of the advanced spring 10 in which one or more couplers 48 (e.g., a coil 46 or first coupler 32) extend at an angle with respect to the longitudinal axis 42 of the coil spring 30, when the advanced spring is at rest. In this regard, while one or more couplers can extend at any suitable angle with respect to the longitudinal axis, in some embodiments, a radial, central, and/or other axis A (e.g., as shown in FIG. 7A) of the coupler runs at an angle between about 1° and about 270° (or within any subrange thereof) with respect to the longitudinal axis of the coil spring. Indeed, in some embodiments, a radial axis A of one or more couplers runs at an angle α (e.g., as shown in FIG. 7A) that is between about 60° and about 120° with respect to the longitudinal axis of the corresponding coil spring. By way of non-limiting illustration, FIG. 7A shows an embodiment in which the radial axis A of a coupler 48 runs at an angle that is about 90°±10° with respect to the longitudinal axis 42 of the coil spring 30. In this regard, having one or more couplers extend at an angle (e.g., perpendicular) to the longitudinal axis of the advanced spring can provide the advanced spring with a variety of features. By way of non-limiting illustration, by having end coils extend at a lateral side and at an angle to the longitudinal axis of the coil spring, some embodiments of the advanced spring that are configured to be used in a patient's mouth are also configured to allow the end coil (or coupler) to lay substantially flush with a top of a bracket 18 after looping around the hook (or anchor)—thus allowing the end coil or coupler to help hold the coil spring 30 away from the patient's teeth and gums during use (e.g., as shown in FIG. 7D).

The couplers 48 can extend any suitable distance from the coil spring 30 (e.g., the last coil at an end, such as end 34 or 38, of the coil 46 from which the coupler extends). For instance, the couplers can extend a length L1 from the coil spring (e.g., as shown in FIG. 6A) between about 0.1 mm and about 2 m (or within any subrange thereof). Indeed, in some embodiments, each coupler is configured to be between about 1 mm and about 2 cm in length L1 (e.g., between about 1 mm and about 5 mm or about 3 mm±0.5 mm).

The advanced spring 10 can be any suitable length from end to end. Indeed, in some embodiments in which the advanced spring comprises a single coil spring 30 that is flanked by two couplers (e.g., the first 32 and second 36 couplers), the total length L2 (as shown in FIG. 6A) of the advanced spring (e.g., from an end of the first coupler 32 to an end of the second coupler 36) when the advanced spring is at rest is between about 1 mm and about 100 m, or within any subrange thereof (e.g., between about 5 mm and about 2 m).

Indeed, in some embodiments, in which the advanced spring 10 is used in a patient's mouth, the advanced spring has a length of between about 5 mm and about 35 mm (or within any subrange thereof). In some embodiments, when the advanced spring is at rest, its total length L2 is about 10 mm±2 mm. In some other embodiments, when the advanced spring is at rest, its total length L2 is about 15 mm±2 mm. In yet other embodiments, when the advanced spring is at rest, its total length L2 is about 20 mm±2 mm. In some other embodiments, its total length is about 23 mm±2 mm. In still some other embodiments, the total length of the advanced spring is 27 mm±2 mm. In this regard, the different lengths of the advanced spring can be used for a variety of purposes. For instance, an advanced spring that is about 1 m in length can be used to help lift a garage door. Additionally, where the advanced spring is configured to be used in a patient's mouth, a relatively long (e.g., 27 mm) and/or a relatively medium (e.g., 23 mm) length (relatively speaking) of the advanced spring can be used for some Class III treatments, while a "medium" (e.g., 23 mm) and/or a relatively short (e.g., 20 mm) advanced spring (again, relatively speaking) can be used for some Class II treatments.

In addition to the aforementioned components and characteristics, the described advanced spring 10 can be modified in any manner that allows it to be used as a spring (e.g., to be coupled to a machine, a door closure, an upper 15 and/or lower 23 dental arch and/or to help move teeth and/or jaw alignment, and/or to be used in any other suitable manner and/or for any other suitable application). In one example, instead of having a single coil spring 30 (e.g., as shown in FIGS. 2A-2D), some embodiments of the advanced spring 10 include 2, 3, 4, 5, 6, 7, or more coil springs.

By way of non-limiting illustration, FIG. 8A shows an embodiment in which the advanced spring 10 comprises two coil springs 30. While such an advanced spring can have any suitable configuration (e.g., being substantially straight, being curved, and/or having any other suitable shape), FIG. 8A shows that, in some embodiments, such an advanced spring has a V-shaped appearance. In this regard, such an advanced spring is configured to: have a first coupler 32 couple to an object at a first surface (e.g., a floor, an anchor on a first dental arch (e.g., either the upper 15 or the lower 23 dental arch), and/or to any other suitable surface), to have a second coupler 36 couple to an object in a different location (e.g., to a ceiling, an anchor on a second dental arch, and/or to any other suitable object), and to have a third coupler 56 couple to another object at the first surface (e.g., an anchor on the first dental arch).

As another example, FIG. 8B shows an embodiment in which the advanced spring 10 comprises three coil springs 30, with a coupler 48 (e.g., the second coupler 36 and the third coupler 56) being disposed between adjacent coil springs of the advanced spring 10 and a coupler (e.g., the first coupler 32 and the fourth coupler 58) being disposed at the ends of the advanced spring 10. While such an advanced spring can have any suitable configuration (e.g., being substantially straight, having a zig-zag configuration, and/or any other suitable shape), FIG. 8B shows that, in some embodiments, such an advanced spring has a U-shaped, square-shaped, and/or three-sided appearance. In this regard, such an advanced spring is configured to function in any suitable manner, including, without limitation, to: have its first coupler 32 couple to an object on a first surface (e.g., a first dental arch on either the upper 15 or the lower 23 dental arch), have its second coupler 36 couple to an object on a second surface (e.g., a second dental arch), have its third coupler 56 couple to another object on the second surface (e.g., another anchor on the second dental arch), and have its fourth coupler 58 couple to another object on the first surface (e.g., another anchor on the first dental arch).

In this regard, it should be noted that while a longer coil spring 30 (e.g., a single coil spring that extends between only two couplers 48) could be used in the configurations mentioned above with respect to FIGS. 8A-8B (e.g., by having its continuous coils wrapped across multiple anchors and/or other objects), by instead having the coil springs of the advanced spring 10 be separated by one or more couplers (e.g., the second 36 and/or third 56 couplers), some embodiments comprising multiple coil springs (such as the coil springs shown in FIGS. 8A-8B) can have their respective couplers 48 couple to multiple locations (e.g., anchors 12 and/or 20) without having coils 46 from the advanced spring get entangled with other components (e.g., with material near the advanced spring, with an archwire (e.g., 16 or 24), with the anchor, and/or an archwire coupler (e.g., ligature, power chain, ligature chain, tie wire, and/or any other suitable type of structure that is capable of coupling the archwire to a bracket)).

As another example of a suitable modification, in some embodiments, one or more coil springs 30 of the advanced spring 10 comprise one or more internal coils (or internal coils) that (in some embodiments) extend between and are directly coupled to two external coils and that are at least partially disposed within (and/or that extend into) a lumen 52 of a coil spring. By way of non-limiting illustration, FIG. 8C shows an embodiment in which one or more internal coils 60 (e.g., an internal coil 61, as shown in FIG. 8E) are disposed at repeated intervals; irregular locations; and/or with any other suitable spacing, pattern, and/or location within the lumen 52 of the coil spring 30.

Figure 8C:
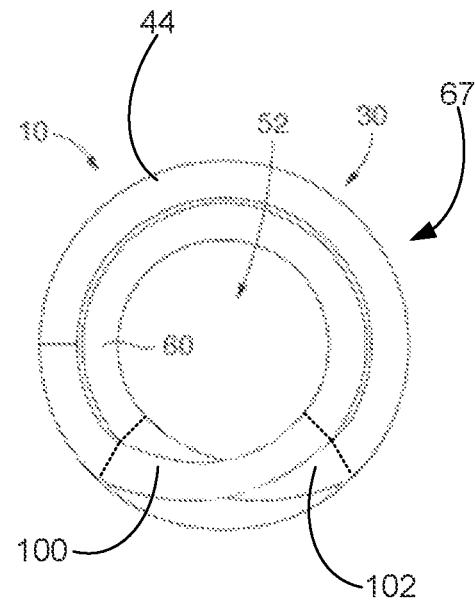
FIG. 8C depicts a cross-sectional view (or a face view) of a coil spring of the advanced spring, wherein the coil spring comprises a continuous wire that forms both an outer (or external) coil and an inner (or internal) coil in accordance with a representative embodiment.

While FIG. 8C shows an embodiment in which the advanced spring 10 is substantially cylindrical (e.g., having external coils 67 and internal coils 60 in which a majority of a length of the internal and external coils is substantially circular), in some other embodiments, the internal coils and the external coils can have any other suitable shape, including, without limitation, having a cross-sectional view (e.g., or face view when such cross-sectional view is taken perpendicular to a longitudinal (or radial) axis 42 of the coil spring 30) that is substantially (e.g., with the exceptions of transitional portions between the external and internal coils) circular, elliptical, ovular, square, D-shaped, polygonal, irregular, star shaped, crescent-moon shaped, and/or that have any other suitable shape.

In some embodiments, the internal coils 60 have a similar (or the same) shape as the external coils 67. For instance, in some embodiments in which the external coils are circular or square, the internal coils are respectively circular or square. In some other embodiments, one or more of the internal coils have a different shape than one or more of the external coils. In this regard, the internal coils and the external coils can have any combination or combinations of shapes that allow the advanced spring 10 to function as a spring. For instance, in some embodiments in which one or more of the external coils has a square shape (e.g., from a face view), one or more of the internal coils has a circular shape.

In some embodiments in which the coil spring 30 includes one or more internal coils 60, not all of the external coils 67 in the coil spring are the same size. For instance, in some embodiments, one or more external coils (or coils that define a portion of the inner lumen 52 of the coil spring) are sized differently than one or more other external coils in the coil spring (e.g., to provide the coil spring with tapered ends, to provide the spring with non-cylindrical and/or non-prismatic shape, and/or for any other suitable purpose). In some other embodiments, however, multiple external coils in the coil spring are of the same size and shape such that the spring has a substantially cylindrical shape (e.g., where the external coils are circular in shape), a substantially polygonal prismatic shape (e.g., where the external coils are polygonal in shape), and/or any other suitable shape. Indeed, in some embodiments in which the coil spring comprises a closed coil spring (or in which the coil spring is compressed such that surfaces of adjacent coils contact each other (e.g., as shown in FIG. 8D), at least a portion the coil spring has a substantially cylindrical shape (with the exception of the transitional portions of the spring where an external coil connects to an internal coil and vice versa). Thus, in some embodiments, when the spring is at rest (or is compressed and/or is twisted) such that adjacent external coils 67 contact each, the coil spring has a cylindrical (and/or another suitable shape) with the internal coils being disposed within the inner lumen 52 of the coil spring 30, as shown in FIGS. 8D-8E. Indeed, in some cases, no matter the cross-sectional shape of the coil spring (e.g., circular, square, polygonal, etc.), when the spring is at rest (or compressed) such that adjacent external coils contact each other, corresponding internal coils are configured to fit within a portion of a lumen of the coil spring that is defined by the adjacent external coils.

The internal coils 60 can be any suitable size with respect to the external coils 67 that allows the advanced spring 10 to function as a spring. For instance, in some embodiments in which one or more coil springs 30 of the advanced spring comprise one or more internal coils, multiple external coils define at least a portion of an inner lumen 52 the coil spring. In some such embodiments, the internal coils are sized and shaped to fit (e.g., as shown in FIG. 8C) within an inner diameter (and/or the inner dimensions) of the lumen 52 as defined by one or more internal surfaces of the external coils 67. In this regard, the internal coils can have any suitable outer diameter (or width, where the coils of the coils spring are not circular) with respect to an inner diameter or width of the lumen. For instance, in some embodiments, the outer diameter (or width) of one or more internal coils (when viewed from a face view as shown in FIG. 8C) is within any subrange between about 5% and about 110% (e.g., where the internal coils seat in one or more ridges between the external coils) of the inner diameter (or width) of one or more of the external coils. Indeed, in some embodiments, the outer diameter (or outer width) of one or more of the internal coils is between about 60% and about 99% of the inner diameter (or inner width) of one or more adjacent coils (when viewed from a face view). Thus, in some embodiments in which the coil spring has circular coils, one or more of the internal coils have a smaller radius of curvature than one or more external coils of the coil spring.

While the coil spring 30 can have any suitable configuration when it comprises one or more internal coils 60 (e.g., as discussed herein), FIGS. 8D-8E show some embodiments of such a coil spring 30. In particular, FIG. 8E shows that, in some embodiments, a portion of the coil spring 30 that is labeled as A extends into the page and down to the portion of the spring that is labeled as B, which, in turn, is coming out of the page and coiling back up to the portion of the spring that is labeled as C, with such portion coiling back into the page and down to the portion of the spring that is labeled as D, and with such pattern continuing on in this drawing to the portion of the spring that is labeled as KK. In this regard, FIG. 8E shows that, in some cases, the spring 30 comprises multiple internal coils 60 (e.g., internal tension coils 61) that are at least partially disposed within the spring's lumen 52 (e.g., the portions of the coils that extend between 0 and P, U and V, AA and BB, and GG and HH).

Additionally, while the coil spring 30 can have any suitable configuration, FIGS. 8D-8E show that, in some embodiments, one or more portions of the spring 30 comprise one internal coil 61 (e.g., internal tension, torsion, and/or compression coil, as shown by the portion of the spring labeled as O and P in FIG. 8E) that spans across roughly two external coils 67 (e.g., the coils labeled in FIG. 8E as 68 and 69). In other words, some portions of the coil spring comprise one internal coil for two corresponding external coils. In some other embodiments, however, one or more portions of the coil spring comprise one internal coil for 1, 3, 4, 5, 6, 7, 8, and/or any other suitable number of external coils. Additionally, while internal coils can be interspersed throughout the entire length of the coil spring, FIGS. 8D and 8E show some that, in some embodiments, one or more portions of the spring 30 (e.g., portion 71) do not include an internal coil. In this regard, the internal coils can be disposed in any suitable portion of a coil spring, including, without limitation, throughout an entire length of the spring, at one or both ends of the spring, randomly through the coil spring, regularly throughout the spring, in one or more patterns throughout the coil spring, at any location between the two ends of the coil spring, and/or in any other suitable location.

While FIGS. 8D and 8E show some embodiments in which the internal coils 60 are disposed in an internal lumen 52 of a tension spring, the internal coils can be used in any other suitable type of coil spring. Indeed, in some embodiments, one or more internal coils are disposed within a lumen 52 of a compression spring (e.g., an open coil spring that has spacing between one or more of its coils when the coil spring is at rest) and/or a torsion spring. In this regard, FIGS. 8D and 8E not only show an embodiment of a coil spring 30 at rest (e.g., a tension spring and/or a torsion spring), but they also show embodiments of compression springs 72 that fully compressed (and/or of tension springs).

When one or more internal coils 60 (or coils that are configured to be disposed within an inner lumen 52 defined by adjacent external coils 67 that are contacting each other when the coil spring is at rest, compressed, and/or twisted) are used for a coil spring 30, a tension spring (e.g., as shown in FIG. 1A), a torsion spring, and/or a compression spring 72 (with an advanced spring, a tension spring, a torsion spring, and/or a compression spring having one or more of the described internal coils sometimes being referred to herein as a supercoil spring), the internal coils 60 of the supercoil spring can pass into the lumen 52 of the supercoil spring (e.g., the coil spring 30 and/or any other suitable type of supercoil spring) in any suitable location. Indeed, in some embodiments (e.g., as shown in FIGS. 8C-8E), multiple internal coils 60 extend into the spring's lumen 52 at roughly the same radial location as each other (e.g., with a first (e.g., an initial) and a second (e.g., a terminal) transitional portion of each of the internal coils being disposed along one lateral side of the coil spring).

With regard to the transitional portions for each of the internal coils 60, reference to such a portion may refer to a portion of the coil spring 30 that transitions from the standard shape of an external coil 67 to the standard shape of an internal coil 60, and vice versa. In other words, the transitional portion can refer to a portion of the coil spring over which an external coil varies from its shape (e.g., its circular circumference, a straight portion of a polygonal coil, a corner of a polygonal coil, and/or otherwise varies from its general shape) to transition into the general shape of a corresponding internal coil. By way of non-limiting illustration, FIG. 8C shows 100 a first transitional portion 100 in which the spring wire 44 varies from a first radius of curvature of an external coil 67 to a second radius of curvature of an internal coil 60 (e.g., with such transitional portion being identified herein with dotted lines). FIG. 8C further shows an embodiment in which the coil spring 30 comprises a second transitional portion 102 in which the spring wire 44 varies from the second radius of curvature of the internal coil 60 to the first radius of curvature of another external coil 67 (and vice versa).

Figure 8F:
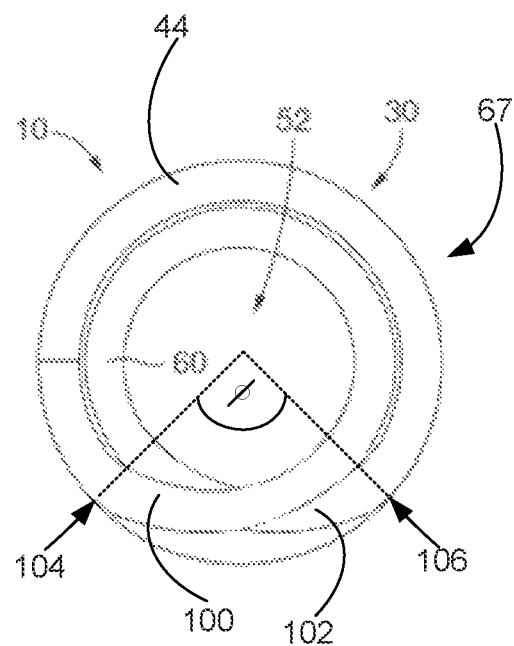
FIG. 8F depicts a cross-sectional (or face) view of a coil spring of the advanced spring, wherein the coil spring comprises a continuous wire that forms both an outer (or external) coil and an inner (or internal) coil in accordance with a representative embodiment.

In some cases, the location at which an external coil 67 varies from its standard shape to transition into (or from) the standard shape of an internal coil 60 can be referred to as a starting of a transitional portion. By way of non-limiting illustration, FIG. 8F shows an embodiment in which a starting 104 of the first transitional portion 100 and the starting 106 of the second transitional portion 102 are identified. In this regard, the starting of the first transitional portion and the second transitional portion of an internal coil 60 can be offset from each other by any suitable distance or angle. For instance, whether the coil spring 30 has a cylindrical shape, a prismatic shape, and/or any other suitable shape, the staring of the first transitional portion and the starting of a second transitional portion for an internal coil 60 can be offset from each other by any suitable amount angle (e.g., angle θ, as shown in FIG. 8F). Indeed, in some embodiments, the starting of the first transitional portion and the starting of the second transitional portion of the same internal coil are radially offset from each other by between about 0° and about 359°, or within any subrange thereof. Indeed, in some embodiments, the starting of the first transitional portion and the starting of the second transitional portion of the same internal coil are radially offset from each other by an angle θ of between about 5° and about 120°, or within any subrange thereof (e.g., between about 10° and about 95°).

In some embodiments, the supercoil spring (e.g., the advanced spring 10 shown in FIGS. 8C-8E) can be described as having a spine (e.g., having the starting (104 and/or 106) of the first transitional portion 100 and/or the second transitional portion 102 of each of its internal coils be disposed in the same (and/or at a similar or corresponding) radial locations when the coil spring is at rest). For instance, in some embodiments, when the coil spring is at rest, the starting of the first transitional portion for each (or at least multiple) of the internal coils of the coil spring are roughly aligned (or correspond in position with each other) along a length (e.g., at a lateral side) of the coil spring. Similarly, in some embodiments, when the coil spring is at rest, the starting of the second transitional portion for each (or at least multiple) of the internal coils of the coil spring are roughly aligned (or correspond in position with each other) along a length of the coil spring (e.g., at a lateral side, having any suitable radial placement with respect to the starting of the first transitional portions).

In some embodiments in which the starting 104 for the first transitional portion 100 of each of the internal coils 60 in the coil spring 30 are aligned, it could be said that the coil spring has a spine of startings for the first transitional portions. Similarly, where the starting of the second transitional portion of each of the internal coils in the coil spring are aligned, it could be said that the coil spring has a spine of startings for the second transitional portions. In this regard, where the coil spring has a straight longitudinal axis (e.g., as shown in FIGS. 8D-8E), the spine of startings for the first and/or second transitional portions can have any suitable configuration, including, without limitation, extending straight along a lateral portion of the coil spring, spiraling around the coil spring, zigzagging from one portion of the coil spring to another portion, and/or having any other suitable configuration.

In some other embodiments, the radial locations of each starting 104 of each of the first transitional portions 100 of each of the internal coils 60 are radially displaced from the starting of one or more of the first transitional portions of one or more other internal coils in the coil spring 30 by any suitable angle. Indeed, in some embodiments, the starting of the first transitional portion of one internal coil can be offset from the starting of the first transitional portion of another internal coil by between about 1° and about 359° (or within any subrange thereof). Indeed, in some embodiments, the staring of a first transitional portion of a first internal coil is offset by between about between about 0° and about 180°, or within any subrange thereof, (e.g., between about 0° and about 90°) with respect to a starting of a first transitional portion of a second internal coil. Similarly, the starting 106 of the second transitional portion of an internal coil can be offset from the starting of the second transitional portion of one or more additional internal coils of the coil spring by any suitable angle (including, without limitation, those angles discussed above for the startings of the first transitional portions in the coil spring). Thus, in some embodiments, instead of having a clear spine of startings for the first and/or second transitional portions, the startings of the transitional portions can be disposed in the coil spring in any other suitable manner, including, without limitation, in an apparently random distribution, in a patterned distribution, in an equidistant patterned distribution, in a checkered distribution, and/or in any other suitable manner.

The supercoil spring can further have any suitable number of layers of internally nested internal coils 60. By way of non-limiting illustration, FIGS. 8C-8E show some embodiments in which the spring (e.g., coil spring 30) comprises a single internal layer of internal coils 60. In some other embodiments, however, one or more internal coils in the spring further comprise one or more additional internal coils (or additional internal coils that extend at least partially into a lumen 52 defined by the internal coil(s)). For instance, in some embodiments, the supercoil spring comprises a plurality of external coils 67 that define an inner lumen 52, with one or more internal coils 60 extending from the external coils 67 (e.g., as shown in FIGS. 8C-8E). In some such embodiments (not shown), one or more of the internal coils further comprise and/or are connected to one or more nested internal coils that extend from a corresponding internal coil and are at least partially disposed within a lumen of one or more of the internal coils. Moreover, in some embodiments, one or more of such nested internal coils further comprise (or extend into) one or more additional internally nested internal coils that are at least partially disposed within an internal lumen of one or more of the nested internal coils (with such internal nesting continuing on for as many levels of internal coils as desired). For instance, in some embodiments, the advanced spring 30 has 1, 2, 3, 4, 5, or more nested layers of internal coils.

Where the supercoil spring includes more than a single layer of internal coils 60 (e.g., the internal coils 60, the nested internal coils, the additional internally nested internal coils, etc.), the coils of the various layers of the internal coils (e.g., the nested internal coils, the additional internally nested internal coils, etc.) can have any suitable characteristic, including, without limitation, any of the size relationships, shapes, locations, spacings, configurations, and/or other characteristics set forth above with respect the external coils 67 and the first set of internal coils 60. For instance, in some embodiments, an internally nested layer of internal coils are configured such that one or more internally nested internal coils span or extend across (e.g., as discussed above with respect to the internal coils 60) as many coils of the next external set of coils (or internal coils that are disposed internal to the lumen defined by the external coils, but that are immediately adjacent and external to the applicable internal coils) as is possible to allow the supercoil spring to function (e.g., spanning across about 1, 2, 3, 4, 5, 6, 7, or more coils of the next external set of coils).

Where the advanced spring 10 comprises a supercoil spring, the supercoil spring can have a variety of features. Indeed, in some cases, by having one or more internal coils, some embodiments of the supercoil spring: comprise a longer length of wire 44 than the coil spring 30 would have with simply an outer tension coil and no internal coils; are able to provide more flexibility than would otherwise be provided by some tension springs, compression springs, and/or torsion springs that lack the internal coils; help the force of the supercoil spring be more consistent as the supercoil spring is stretched (or compressed, where the supercoil comprises a compression spring; and/or twisted, where the supercoil comprises a tension spring); can allow for the advanced spring to be shorter while still providing a desired elasticity; can allow for less opening between outer coils (e.g., leading to less chance of pinching the patient's cheek); can allow for the inner and outer coils to stretch open at different rates (e.g., allowing for food trapped on or in the supercoil spring to be broken up easier); and/or can provide a variety of other features. Indeed, in some embodiments, by having the internal coils in the supercoil spring, the supercoil spring can be configured to stretch (or be compressed and/or twisted) between about 2% and about 200% more (or within any subrange thereof) than could the same spring without the internal coils. For instance, some embodiments of the supercoil spring are between about 30% and about 60% more stretchy (and/or compressive) than would the same spring be should such spring lack any internal coils.

In addition to the aforementioned features, the described supercoil spring (or the advanced spring 10 with one or more internal coils) can have any other suitable component or characteristic, including, without limitation, any component or characteristic described herein for use with any other embodiment, example, or illustration of the advanced spring (e.g., couplers 48, shapes, sizes, wire types, sizes, elasticities, configurations, uses, etc.).

Moreover, in some embodiments, the supercoil spring (or the advanced spring 10) includes one or more rods that extend into the lumen 52 of the spring (e.g., along a longitudinal axis of the spring and/or in any other suitable manner).

Additionally, while some embodiments of the supercoil spring and/or the advanced springs 10 described herein are configured for use in orthodontic applications, such springs can be used (and/or be modified for use) in any other suitable application that involves a tension spring, a torsion spring, and/or a compression spring. In this regard, some non-limiting examples of such applications include use of one or more supercoil springs in gas springs, automobiles, automobile shocks, struts, bicycle shocks, mattress springs, toys, vehicles, and/or in any other suitable location. Indeed, in some cases, where space is limited but the need for elasticity is relatively high, the described supercoil can be the spring of choice.

In addition to the aforementioned features, the described advanced spring 10 (the various embodiments described herein) can provide its users with a variety of other features. For instance, unlike some conventional orthodontic elastics that require a person to put a finger or tool in the patient's mouth to remove and/or replace the elastic (something that can be unsanitary), some embodiments of the described advanced spring can last significantly longer than can some conventional orthodontic elastics. Thus, not only can some embodiments of the described advanced spring be more convenient to use, but their use can also be more sanitary than some conventional elastics.

As another feature, some embodiments of the described advanced spring 10 that are configured to be used in a patient's mouth are configured to remain in the patient's mouth for the entire time between visits to the orthodontist's office. In contrast, some conventional orthodontic elastics are intended to be removed (e.g., if they break, after they lose elasticity, during meals, while brushing, one or multiple times daily, etc.). In many such cases, once the elastic is removed, the patient (or the patient's caregiver) may forget about replacing the elastic (or may even choose not to replace the elastic for an extended period of time). Thus, in some such cases, when the patient (or the patient's caregiver) does not replace the elastics as prescribed, the corresponding orthodontic treatment may take longer to be accomplished and/or may not be accomplished as desired. In contrast, because some embodiments of the described advanced spring are configured to retain their elasticity and to be kept in a patient's mouth for relatively long periods of time, such embodiments can provide desired treatments in shorter periods of time, more effectively, and/or with less frustration than may otherwise be achieved.

As still another feature associated with some embodiments of the described advanced spring 10, some competing devices are prone to break and (where the devices are worn in a mouth) to thereby cause pain to their wearer. Additionally, some competing devices are prone to fatigue relatively quickly. In contrast, some embodiments of the described advanced spring are configured to not break or significantly fatigue under normal use. Again, such features allow some embodiments of the described advanced spring to: have a relatively long service life, retain their resilience, remain in a patient's mouth longer, be more comfortable to use (e.g., where used in a mouth), be more resistant to strain hardening, have a higher fatigue life (e.g., not failing after thousands of cycles of the spring), require shorter treatment times, provide more predictable results, provide more versatility for attachment points and configurations, and/or to otherwise be more effective than some conventional springs and/or orthodontic elastics.

Additionally, some competing devices can have screw stops (and/or other coupling devices) coupled at one end of a spring, with such screw tops (or other coupling devices) being difficult to use, subject to braking off, and/or requiring special equipment to couple such devices to braces. In contrast, some embodiments of the described advanced spring 10 have a coupler 48 that is integrally formed with and coupled to the other components of the advanced spring. Moreover, because of the shape and configuration of the couplers included in the described advanced spring, the advanced spring can be used virtually anywhere that a conventional spring and/or orthodontic elastic can be used. For instance, some embodiments of the described advanced spring can replace conventional Class 1 elastics (e.g., to close spaces between teeth on the same dental arch), Class II elastics (e.g., to correct overbites), Class III elastics (e.g., to correct underbites), vertical elastics (e.g., to keep teeth together), front cross elastics (e.g., to correct a midline), Class II triangles, seating elastics, Class III triangles, V elastics, posterior box elastics, anterior vertical elastics, and/or any other suitable type of orthodontic elastics.

Moreover, in addition to having some embodiments be used with traditional metal braces, some embodiments of the described advanced spring 10 can be used with any other suitable orthodontic equipment. By way of non-limiting example, some embodiments of the advanced spring are configured to be used with gold-plated braces, stainless steel braces, lingual braces, titanium braces, progressive braces, clear removable aligners, self-ligating braces, customized orthodontic treatment systems, clear braces, retainers, Carriere appliances, headgear, extra-oral orthodontic devices, impacted teeth having bracket placed thereon, and/or any other suitable type of orthodontic equipment.

The described advanced spring 10 can be used in any suitable manner that allows it to function as intended. For instance, in some embodiments, the advanced spring comprises a tension spring. In some other embodiments, the advanced spring comprises a compression spring. In still other embodiments, the advanced spring comprises a torsion spring. In this regard, the advanced spring can (as mentioned above) be used in virtually any application that a competing spring or elastic can be used.

In this regard, while the advanced spring 10 can be used for dental care in any suitable manner, in some embodiments, a coupler 48 of the advanced spring is placed over a portion of an anchor (e.g., anchors 12 or 20), with the coupler being held in place by the tension applied to the coupler on the anchor by the coil spring 30. In some other embodiments, however, one or more couplers of the advanced spring are held on corresponding anchors by the use of one or more archwire couplers (e.g., ligatures, bracket elastics, twisted wires, tie wires, power chains, ligature chains, and/or any other suitable coupler that is configured to couple the archwire to the bracket and/or any other suitable portion of a brace), ties, wraps, and/or any other suitable advanced spring bindings that are configured to couple a portion of one of the advanced spring's couplers to an anchor.

Figure 9A:
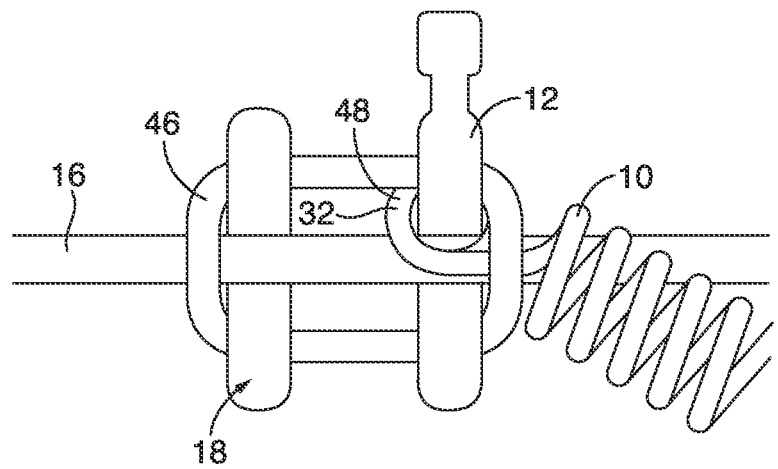
FIG. 9A depicts a bracket comprising an anchor, wherein an orthodontic archwire is coupled to the bracket with an archwire coupler, and wherein a portion of a first coupler of the advanced spring is disposed between the archwire and the archwire coupler in accordance with a representative embodiment.

Indeed, in accordance with some embodiments, FIG. 9A shows that an archwire (e.g., archwire 16) is coupled to a bracket 18 through the use of an archwire coupler 62 (e.g., a ligature). In this regard, while the coupler 48 of the advanced spring 10 can be disposed over the anchor 12 and the archwire coupler 62 (e.g., such that the coupler can be removed from the anchor without moving the archwire coupler), FIG. 9A shows an embodiment in which a portion of the first coupler 32 is sandwiched between a portion of the archwire 16 and a portion of the archwire coupler 62. Thus, in some embodiments, the advanced spring is held in place by one or more archwire couplers (e.g., ligature chains, power chains, ligatures, etc.) and/or other advanced spring bindings. Accordingly, in some such embodiments, the advanced spring is configured to be held in place on multiple anchors for the duration of time between a patient's visits to the orthodontist's office.

Figure 9B:
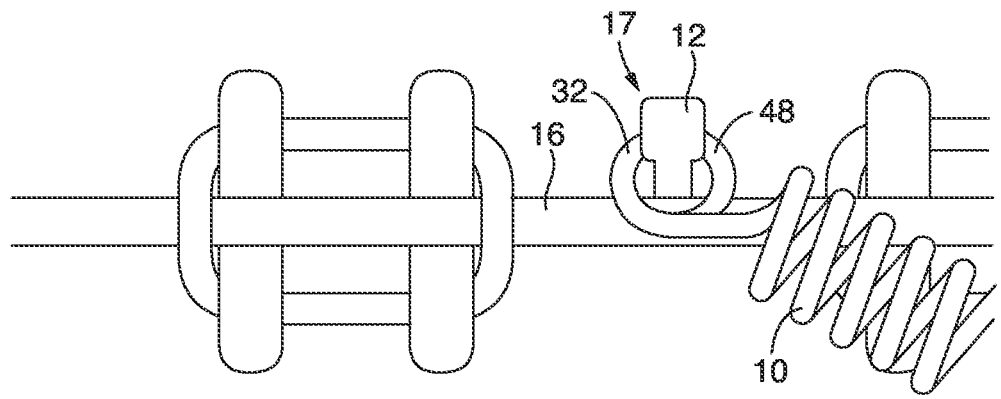
FIG. 9B depicts an archwire comprising an anchor, wherein the first coupler of the advanced spring couples to the anchor.
Figure 9C:
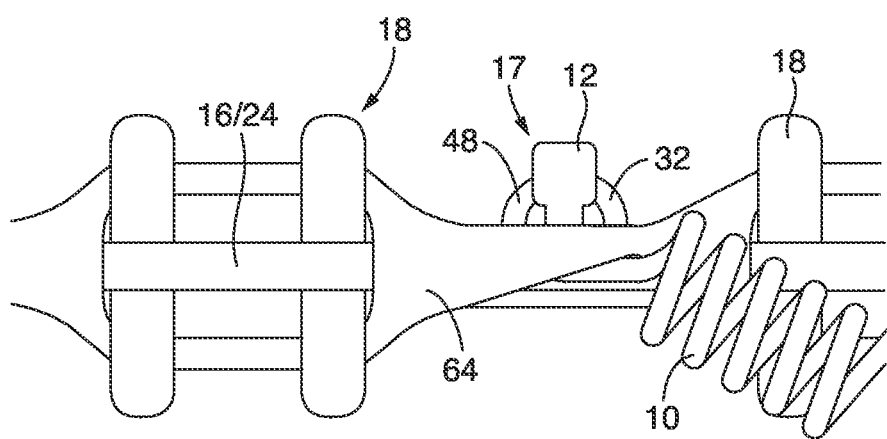
FIG. 9C depicts the archwire comprising the anchor, wherein the first coupler of the advanced spring couples to the anchor, and wherein a portion of a first coupler of the advanced spring is locked to the anchor by a ligature chain that overlaps the anchor and the first coupler in accordance with a representative embodiment.

In another non-limiting illustration, FIG. 9B shows an embodiment in which a coupler 48 of the advanced spring 10 is coupled to an anchor 12 (e.g., to a posted archwire 17 and/or to any other suitable type of anchor, on the upper 15 and/or the lower 23 dental arch). Moreover, FIG. 9C shows that, in some embodiments, a ligature chain 64 extends over a portion of the archwire (e.g., archwire 16), over a portion of the anchor 12 (e.g., the posted archwire 17), and over a portion of the coupler 32 (and/or 36) to couple the advanced spring to the anchor, with a portion of the coupler being sandwiched between the archwire and the ligature chain.

Figure 9D:
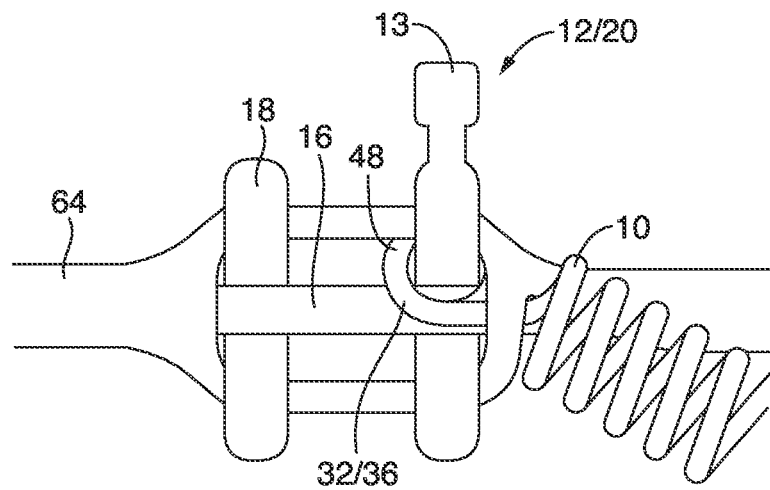
FIG. 9D depicts the bracket comprising the anchor, wherein the first coupler of the advanced spring couples to the anchor, and wherein a portion of a first coupler of the advanced spring is locked to the anchor by a ligature chain that overlaps the anchor and the first coupler in accordance with a representative embodiment.

FIG. 9D shows that, in some embodiments, an archwire (e.g., archwire 16 is coupled to a bracket 18 comprising a hook 13). Moreover, that figure shows that, in some embodiments, a coupler 48 (e.g., the first coupler 32 and/or any other suitable coupler) extends over the hook 13. Additionally, that figure shows that, in some embodiments, a ligature chain 64 extends over a portion of the coupler (e.g., the first coupler 32 and/or any other suitable coupler) so as to dispose a portion of the coupler between the archwire (e.g., archwire 16 and/or any other suitable archwire) and the ligature chain 64.

Figure 9E:
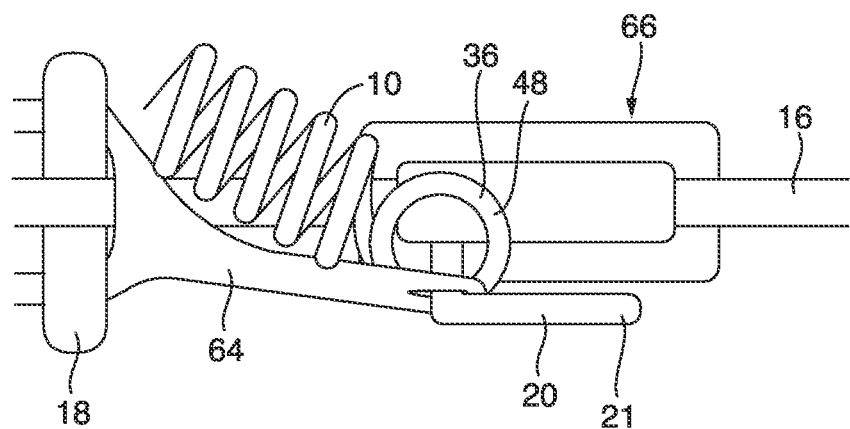
FIG. 9E depicts the molar bracket comprising the anchor, wherein the first coupler of the advanced spring couples to the anchor, and wherein a portion of a first coupler of the advanced spring is locked to the anchor by a ligature chain that overlaps the anchor and the first coupler in accordance with a representative embodiment.

FIG. 9E shows that, in some embodiments, a molar bracket 66 comprises a poking hook 21 (and/or any other suitable anchor, such as the first 12 and/or second 20 anchor). Moreover, that figure shows an embodiment in which a coupler 48 (e.g., the second coupler 36) is disposed on the poking hook 21, with the ligature chain 64 being disposed on top of a portion of the coupler 48, such that the coupler is bound onto the hook by the ligature chain 64, with the coupler being sandwiched between a portion of the bracket 66 and the ligature chain 64.

Figure 9F:
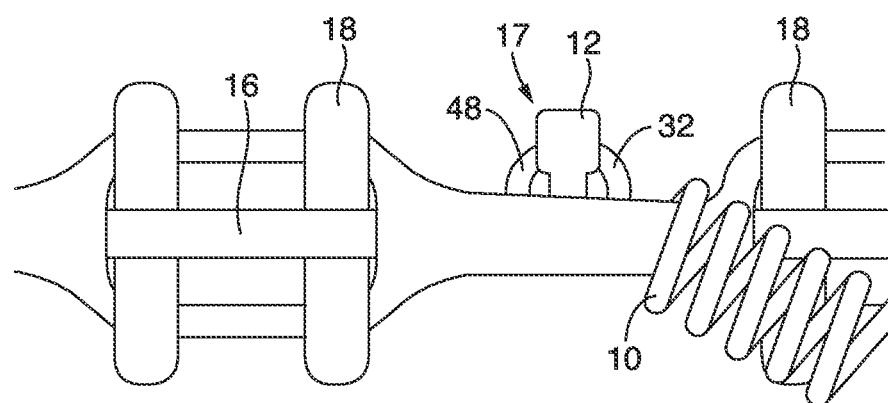
FIG. 9F depicts the archwire comprising the anchor, wherein the first coupler of the advanced spring couples to the anchor, and wherein a portion of a first coupler of the advanced spring is locked to the anchor by a power chain that overlaps the anchor and the first coupler in accordance with a representative embodiment.

Additionally, FIG. 9F shows that, in some embodiments, a power chain 63 is coupled to one or more brackets 18 and a coupler 48 (e.g., the first coupler 32) is coupled to a posted archwire 17, with the power chain 63 extending over a portion of the coupler 48 so as to lock the advanced spring 10 on the anchor 12.

The described advanced spring 10 can comprise any suitable material that allows it to function as described herein. Some non-limiting examples of such materials include one or more: metals or alloys (e.g., nickel-titanium; copper-nickel-titanium; heat activated nickel-titanium; titanium-molybdenum; stainless steel; a mix of cobalt, chromium, nickel, molybdenum, iron, and/or magnesium; plastics; polymers; ceramics; synthetic materials; and/or other suitable materials. In some embodiments, however (e.g., where the advanced spring is configured to be used in a mouth), the advanced spring comprises nickel-titanium, and/or copper-nickel-titanium). More particularly, some embodiments of the advanced spring comprise a continuous wire 44 comprising copper-nickel-titanium.

Thus, as discussed herein, some embodiments of the present invention relate to springs. In particular, some embodiments relate to systems and methods for providing an advanced or a supercoil spring. While the described spring can include any suitable feature, in some cases, it includes a coil spring having multiple external coils that define a portion of an inner lumen of the coil spring. In some such case, the coil spring further includes a first internal coil that extends at least partially into the inner lumen of the coil spring. In some cases, the external coils and the first internal coil are each made of, and comprise part of, one single continuous spring wire. In some cases, the coil spring includes a tension spring such that surfaces of adjacent external coils contact each other, and such that the first internal coil is disposed within a portion of the inner lumen defined by the adjacent external coils, when the coil spring is at rest.

The present systems and methods may be embodied in other specific forms without departing from their spirit or essential characteristics. The described systems, methods, embodiments, examples, and illustrations are to be considered in all respects only as illustrative and not restrictive. Any portion of any system, method, embodiment, example, implementation, illustration, component, characteristic, and/or other feature of the described systems and methods can be combined, mixed, and/or otherwise used with any other suitable portion of any other feature and in any suitable manner. For instance, the described advanced springs, coils, couplers, and/or any other feature or method described herein can be used with any other feature or method described herein, and in any suitable manner.

The scope of the described systems and methods is, therefore, indicated by the appended claims rather than by the foregoing description. All changes that come within the meaning and range of equivalency of the claims are to be embraced within their scope. In addition, as the terms on, disposed on, attached to, connected to, coupled to, etc. are used herein, one object (e.g., a material, element, structure, member, etc.) can be on, disposed on, attached to, connected to, or coupled to another object—regardless of whether the one object is directly on, attached, connected, or coupled to the other object, or whether there are one or more intervening objects between the one object and the other object. Also, directions (e.g., front, back, on top of, below, above, top, bottom, side, up, down, under, over, upper, lower, etc.), if provided, are relative and provided solely by way of example and for ease of illustration and discussion and not by way of limitation. Where reference is made to a list of elements (e.g., elements a, b, c), such reference is intended to include any one of the listed elements by itself, any combination of less than all of the listed elements, and/or a combination of all of the listed elements. Furthermore, as used herein, the terms a, an, and one may each be interchangeable with the terms at least one and one or more.

What is claimed is:

1. A supercoil spring comprising:
a coil spring comprising:
multiple external coils that define an inner lumen of the coil spring, the multiple external coils comprising:
a first external coil; and
a second external coil;
a first internal coil that extends at least partially into the inner lumen of the coil spring and that is coupled directly to the first external coil by a first transitional portion; and
a second internal coil that extends at least partially into the inner lumen of the coil spring and that is coupled directly to the second external coil by a second transitional portion,
wherein the multiple external coils, the first transitional portion, the first internal coil, the second internal coil, and the second transitional portion are each made of, and comprise part of, one single continuous spring wire.

2. The supercoil spring of claim 1, wherein a radius of curvature of the first internal coil is smaller than a radius of curvature of the first external coil and a radius of curvature of the second external coil.

3. The supercoil spring of claim 1, wherein the first external coil, the first transitional portion, the first internal coil, the second internal coil, the second transitional portion, and the second external coil are progressively located farther down a length of the single continuous spring wire.

4. The supercoil spring of claim 1, wherein the coil spring comprises a third external coil, a fourth external coil, and a third internal coil, wherein the third internal coil has a first part that is coupled to the third external coil by a third transitional portion and a second part that is coupled to the fourth external coil by a fourth transitional portion such that the third internal coil is flanked by the third external coil and the fourth external coil.

5. The supercoil spring of claim 1, wherein the first transitional portion and the second transitional portion are disposed at a first lateral side of the coil spring.

6. The supercoil spring of claim 1, wherein an outer diameter of the first internal coil fits within an inner diameter of the inner lumen.

7. The supercoil spring of claim 4, wherein the first transitional portion, the second transitional portion, the third transitional portion, and the fourth transitional portion are each disposed along a lateral side of the coil spring when the coil spring is at rest.

8. The supercoil spring of claim 1, wherein each of the first external coil and the second external coil have a portion having a same radius of curvature such that the coil spring has a substantially cylindrical shape.

9. A supercoil spring comprising:
a coil spring comprising:
a first external coil and a second external coil that define a portion of an inner lumen of the coil spring; and
a first internal coil that is coupled to, and flanked by, the first external coil and the second external coil and that extends at least partially into the portion of the inner lumen of the coil spring that is defined by the first external coil and the second external coil,
wherein a first portion the first internal coil is coupled to the first external coil by a first transitional portion that transitions the coil spring from an outer width of the first external coil to a reduced outer width of the first internal coil, wherein a second portion of the first internal coil is coupled to the second external coil by a second transitional portion that transitions the coil spring from the reduced outer width of the first internal coil to an increased outer width of the second external coil, and wherein first external coil, the first transitional portion, the first internal coil, the second transitional portion, and the second external coil are each made of, and comprise part of, one single continuous spring wire.

10. The supercoil spring of claim 9, wherein the coil spring comprises a tension spring, and wherein the first transitional portion and the second transitional portion are disposed adjacent to each other at a first lateral side of the coil spring.

11. The supercoil spring of claim 10, wherein the coil spring further comprises a second internal coil, a third external coil, and a fourth external coil, wherein the second internal coil is coupled to the third external coil via a third transitional portion, wherein the second internal coil is further coupled to the fourth external coil via a fourth transitional portion, and wherein the third and fourth transitional portions are radially offset from the first lateral side of the coil spring.

12. The supercoil spring of claim 9, wherein the first internal coil, the first external coil, and the second external coil each have a portion having at least a partially polygonal face profile.

13. The supercoil spring of claim 9, wherein the coil spring further comprises additional external coils, wherein the first external coil, the second external coil, and the additional external coils each have similar outer dimensions.

14. The supercoil spring of claim 9, wherein the coil spring comprises a first coupler at a first end of the coil spring, wherein the first coupler is made of, and comprises part of, the one single continuous spring wire, and wherein a terminal end of the first coupler extends into the inner lumen of the coil spring when the coil spring is at rest.

15. A supercoil spring comprising:
a tension coil spring comprising:
first external coil;
a second external coil; and
a first internal coil having:
a first portion that is coupled to a first transitional portion that, in turn, couples to the first external coil; and
a second portion that is coupled to a second transitional portion that, in turns, couples to the second external coil such that the first internal coil is contiguous with, and flanked by, the first external coil and the second external coil, wherein the first internal coil extends into, and is at least partially disposed within a portion of an inner lumen that is defined by the first external coil and the second external coil, wherein the first external coil and the second external coil each have an outer width of a first size, wherein the first internal coil has an outer width that is smaller than the outer width of the first external coil and the second external coil, and wherein the first external coil, the first transitional portion, the first internal coil, the second transitional portion, and the second external coil are each made of, and comprise part of, one single continuous spring wire.

16. The supercoil spring of claim 15, wherein the tension coil spring comprises a tension spring, and wherein the first transitional portion and the second transitional portion are disposed adjacent to each other at a first lateral side of the tension coil spring.

17. The supercoil spring of claim 16, wherein the tension coil spring further comprises a second internal coil, a third external coil, and a fourth external coil, wherein the second internal coil is coupled to the third external coil via a third transitional portion, wherein the second internal coil is further coupled to the fourth external coil via a fourth transitional portion, and wherein the third and fourth transitional portions are radially offset from the first lateral side of the tension coil spring.

18. The supercoil spring of claim 15, wherein the one single continuous spring wire has a cross-sectional profile that is selected from a C-shape, a D-shape, and an elliptical shape.

19. The supercoil spring of claim 15, wherein the tension coil spring has a first set of multiple contiguous external coils having a same outer dimension on a first side of the first internal coil and a second set of multiple contiguous external coils having the same outer dimension on a second side of the first internal coil.

20. The supercoil spring of claim 15, wherein the tension coil spring has a substantially cylindrical shape.

* * * * *